US009689368B2

(12) United States Patent
Hopper

(10) Patent No.: US 9,689,368 B2
(45) Date of Patent: Jun. 27, 2017

(54) METHOD AND APPARATUS FOR ENERGY GENERATION

(75) Inventor: Hans P Hopper, Aberdeenshire (GB)

(73) Assignee: Halliburton Energy Services, Inc., Houston, TX (US)

( * ) Notice: Subject to any disclaimer, the term of this patent is extended or adjusted under 35 U.S.C. 154(b) by 332 days.

(21) Appl. No.: 13/976,462

(22) PCT Filed: Dec. 28, 2011

(86) PCT No.: PCT/US2011/067648
§ 371 (c)(1),
(2), (4) Date: Aug. 29, 2013

(87) PCT Pub. No.: WO2012/092392
PCT Pub. Date: Jul. 5, 2012

(65) Prior Publication Data
US 2013/0333370 A1 Dec. 19, 2013

(30) Foreign Application Priority Data
Dec. 30, 2010 (GB) .................................. 1022103.4

(51) Int. Cl.
*F03B 17/02* (2006.01)
*F03B 3/12* (2006.01)
(Continued)

(52) U.S. Cl.
CPC ................ *F03B 3/12* (2013.01); *F03B 13/08* (2013.01); *F03B 13/264* (2013.01);
(Continued)

(58) Field of Classification Search
CPC .......... F03B 3/12; F03B 13/08; F03B 13/264; F03B 13/268; F03B 13/26; F03B 17/063;
(Continued)

(56) References Cited

U.S. PATENT DOCUMENTS 3,928,771 A 12/1975 Straumsnes
4,203,702 A * 5/1980 Williamson .......... F03B 17/063
415/60

(Continued)

OTHER PUBLICATIONS

International Search Report and Written Opinion dated Aug. 29, 2012 for PCT Application No. PCT/US2011/067648 filed Dec. 28, 2011.

(Continued)

*Primary Examiner* — Mark Laurenzi
*Assistant Examiner* — Kelsey Stanek
(74) *Attorney, Agent, or Firm* — Chamberlain Hrdlicka

(57) ABSTRACT

A system for the generation of energy from the flow of water in a body of water is provided, the system comprising a support assembly extending across at least a portion of the body of water; a generator assembly mounted in the support assembly, the generator assembly comprising a first rotor assembly and a second rotor assembly, each rotor assembly comprising a vertical hub rotatable about a vertical axis and a plurality of vertical blades extending radially from the hub, the first and second rotor assemblies being arranged such that the volume swept by the blades of the first rotor assembly overlaps the volume swept by the blades of the second rotor assembly. The system may be used to generate energy, for example electricity. In addition, the system may be used to control the level of water on the upstream side of the installation, for example in the cases of flooding.

59 Claims, 13 Drawing Sheets

(51) Int. Cl.
*F03B 13/08* (2006.01)
*F03B 13/26* (2006.01)
*F03B 17/06* (2006.01)
*E02B 9/04* (2006.01)
*E02B 9/08* (2006.01)

(52) U.S. Cl.
CPC .............. *F03B 17/063* (2013.01); *E02B 9/04* (2013.01); *E02B 9/08* (2013.01); *Y02E 10/28* (2013.01)

(58) Field of Classification Search
CPC ........ F03B 17/062; F03B 17/065; E02B 9/04; E02B 9/08; Y02E 10/28
USPC .................. 60/495, 502, 503; 415/1; 417/3; 137/14; 290/54; 418/104
See application file for complete search history.

(56) References Cited

U.S. PATENT DOCUMENTS

| 7,649,275 | B2  |   | 1/2010 | Janca et al. |
| 8,348,623 | B2  | * | 1/2013 | Vasshus .................... F03B 7/00 137/14 |
| 2008/0085179 | A1 |   | 4/2008 | Kinkaid et al. |
| 2009/0047131 | A1 | * | 2/2009 | Neumann ............... F03B 3/121 416/132 R |
| 2009/0212572 | A1 | * | 8/2009 | Sundermann ......... F03B 17/067 290/54 |
| 2013/0049362 | A1 | * | 2/2013 | Arlitt ..................... F03B 3/126 290/43 |

OTHER PUBLICATIONS

International Preliminary Report on Patentability dated Jul. 11, 2013 for PCT Application No. PCT/US2011/067648 filed Dec. 28, 2011.

* cited by examiner

METHOD AND APPARATUS FOR ENERGY GENERATION

This application is a 35 U.S.C. §371 national stage application of PCT/US2011/067648 filed Dec. 28, 2011, entitled "Method and Apparatus for Energy Generation," which claims priority to Great Britain Application No. GB1022103.4, entitled "Method and Apparatus for Energy Generation", filed Dec. 30, 2010, both of which are herein incorporated by reference in their entirety for all purposes.

The present invention relates to an apparatus for the generation of energy and to a method of energy generation. The apparatus and method of the present invention are particularly suitable for the generation of energy from rivers and seas, for example in tidal locations such as river estuaries and the like. The apparatus and method are also of use in the control of water levels in rivers and estuaries.

The art is replete with concepts and designs for the generation of energy from the flow or movement of water, in particular the flow or movement of water in rivers, river estuaries and seas and oceans. For example, the concept of generating energy from wave motion has been well explored and is currently the subject of much research and development work. To harness the energy of waves, devices operable to convert wave motion of the body of water into energy are located at the surface of the water where they may be acted upon by waves propagating at the water surface. Energy generating devices may be tethered or anchored in a body of water such that they are continually exposed to waves under any prevailing conditions. A wide range of designs of devices for generating energy from the motion of waves has been proposed. Alternatively, it has been proposed to locate energy generating devices on land adjacent a body of water, such that the devices are impacted by waves incident on the shoreline.

An alternative proposal for the generation of energy from the motion of a body of water is to exploit the action of tides. For example, it has been proposed to locate one or more devices for energy generation in a barrage or like structure across an estuary or bay at a location where the water level rises and falls with the tides. The action of the tide, in particular the action of a ebbing tide and the falling water level, is used to drive one or more turbines or other energy generating devices. To date, however, little use has been made of such schemes for the generation of energy.

One system proposed for the generation of energy, in particular electrical energy, employs the use of a turbine mounted in a housing. The turbine is of a largely conventional design, having a blade assembly mounted for rotation about a horizontal axis. The turbine is disposed on the bed of a body of water subject to tidal water flows, such as a river estuary. The movement of water due to the ebbing and flowing of the tide drives the turbine. In one arrangement, the turbine assembly is mounted on a support structure comprising a plurality of legs, with the turbine assembly being moveable up and down the legs, so as to adjust its height relative to the water. Such a system is disclosed in U.S. Pat. No. 4,039,847. The height of the turbine is adjusted during use to account for changes in the water level as a result of the ebb and flow of the tide. In one embodiment, the turbine assemblies are arranged to face in opposing directions, thereby allowing for the generation of energy as the water level both rises and falls due to the tidal action.

Another known arrangement for generating energy from the flow of water arising from the tides and/or at a river estuary or the like employs a turbine assembly have generally vertically extending blades. Sometimes referred to as 'Gorlov's turbines', the turbine blades are helical in nature and rotate about a substantially vertical axis under the action of the impinging flow of water.

Dams or barrages incorporating turbine assemblies for generating energy and extending across a body of water, such as an estuary of a river are also known. For example, U.S. Pat. No. 4,261,171 discloses a dam having turbine assemblies for generating energy during tidal ebb flows and tidal flood flows.

A system for generating energy from the tidal flow of water is disclosed in WO 2008/050149. The system comprises a pontoon that is moored at a suitable tidal location, the pontoon having a duct extending therethrough with an opening at each. The pontoon is oriented such that water flows through the duct under the action of the tide. A rotor assembly is disposed within the duct having a plurality of rotor blades arranged about a vertical shaft and rotatable about a vertical axis. The duct is further provided with one or more deflector vanes, each vane being pivotable about a vertical axis. In operation, the vanes are used to direct the flow of water onto the blades of the rotor assembly.

BE 894,952 discloses a turbine system for generating energy from a flow of water. The turbine system comprises a pontoon that, in use, is moored at a suitable location in a flowing body of water. The pontoon comprises a turbine assembly having a vertical rotatable shaft supporting a plurality of vertical blades. The turbine assembly is disposed in a duct system comprising a first main duct for directing water tangentially onto the blades and two further ducts directing water at a different tangential direction onto the blades. Each blade is provided with hinged flaps which open to prevent the flow of water in an adverse direction from impeding the rotation of the blades.

GB 2,153,917 discloses a system for generating energy from the ebb and flow of tides, the system comprising a pair of vertically oriented rotor assemblies mounted in a pontoon and located in a channel. Water is caused to flow along the channel from one or more reservoirs.

GB 2,337,305 describes and shows a system for generating energy from tidal streams using a vertical rotor blade assembly. The rotor assembly is mounted in a pontoon and anchored to the sea bed. The rotor assembly drives a cam pump system, by which means energy is extracted from the rotation of the rotor assembly. The blades of the rotor assembly may be variable in pitch.

A system for generating energy from tidal flows of water is disclosed in FR 2,867,523. The system comprises a vertical rotor assembly disposed beneath a moored barge. One or a plurality of such rotor assemblies may be employed. The rotor assemblies are disposed in open water without any form of ducting or conduit and are impinged directly by the flowing water.

GB 2,312,931 discloses a system for generating energy from waves or tides. The system comprises a turbine assembly having a rotor assembly comprising vanes extending from a vertical rotor shaft. Each vane is provided with a paddle at its outer edge, each paddle being pivotably mounted to the vane. The paddles are moveable between an open position and a closed position, in which they lie between the edge of the vane and the rotor shaft. The rotor assembly is mounted in a channel or duct, which may be provided with baffles to direct the flow of water onto the rotor assembly.

There is a need for an improved system for the generation of energy from flowing water, in particular the flow of water in rivers and estuaries, as well as the flow of water arising from the tides. It would be advantageous if the system for generating energy in such locations could also serve to control the flow of water, in particular to provide a barrier to avoid high water levels in rivers and the like arising and prevent flooding.

The present invention provides in a first aspect a system for the generation of energy from the flow of water, the system comprising:

a support assembly extending across at least a portion of the body of water;

a generator assembly mounted in the support assembly, the generator assembly comprising a first rotor assembly and a second rotor assembly, each rotor assembly comprising a vertical hub rotatable about a vertical axis and a plurality of vertical blades extending radially from the hub, the first and second rotor assemblies being arranged such that the volume swept by the blades of the first rotor assembly overlaps the volume swept by the blades of the second rotor assembly.

The system of the present invention is particularly adapted for the generation of energy, in particular electrical energy, from water flowing in a river or under the action of tidal movements. This is achieved by allowing the hub assembly to be rotated by the action of the flowing water impinging on the blades of the rotor assembly, this in turn driving a suitable system for generating energy. In addition, the system is arranged, such that the level of water in the waterway, for example in a river and/or estuary, may be controlled. For example, the system may be used to control water levels and avoid flooding arising from adverse weather conditions. The control of water levels is achieved in the system of the present invention by controlling the speed of rotation of the hub assembly, thereby limiting or stopping rotation of the hub assembly and preventing the passage of water past the installation. In one embodiment, the speed of rotation of the hub assembly is controlled by a suitable braking system applied to the hub assembly More preferably, the system comprises means for varying the torque required to rotate the rotatable assembly driven by the rotor assembly. In particular, the rotor assembly is connected to a rotatable take-off system having a variable gear ratio, such that the speed of rotation of the hub assembly may be controlled by varying the gearing of the take-off system. Such a combination of features allows the system to be installed in a wide range of situations and locations, where a known or conventional system for generating energy from river or tidal flows would not be appropriate.

The system of the present invention may be disposed in the flowing body of water by any suitable means, for example by means of a floating barge or pontoon moored at a suitable location. In such cases, the support assembly to which the generator assembly is attached comprises the barge or pontoon. More preferably, the system is incorporated into a fixed structure extending from the bed of the body of water, such as a dam or barrage. In such a case, the support assembly for the generator assembly comprises the dam or barrage. The general aspects of constructing such a dam or barrage in or across a body of water are known in the art. In one embodiment, the system of the present invention is constructed in a modular manner, allowing it to be incorporated into a new or existing structure more easily. In a further alternative arrangement, the support assembly for the generator assembly may be a suitable frame or other support disposed at a suitable location such that the generator assembly is supported and retained in a flow of water. Suitable support structures will be readily apparent to the person skilled in the art.

The system may comprise a single generator assembly. Alternatively, and more preferably in many situations, the system comprises a plurality of generator assemblies. The plurality of generator assemblies may be of a single design and configuration or of different configurations, depending upon their respective location in the water way. It has been found that the use of generator assemblies having rotor assemblies rotatable about a vertical axis is particularly suitable for both the generation of energy from the flow of water and allowing the water level to be controlled. In particular, the vertically oriented rotor assemblies allow the flow of water through the system to be stopped, thus acting as a barrier, such as a flood barrier or the like.

The system may be arranged to extend partially or wholly across the waterway in which it is situated. Greater and total control of the flow of water and of the water level in the waterway will be obtained by having the system extend across the entire width of the waterway. The precise arrangement of the system will be determined by the particular circumstances of the location in the waterway. For example, the system may be installed to extend directly across the waterway, that is substantially perpendicular to the banks or shore. Alternatively, the system may be installed to extend at an angle to the banks or shore line, as required. Similarly, the system may be installed at any suitable angle to the normal direction of flow of the water in the waterway. In general, it is preferred that the system is disposed to extend perpendicular to the normal prevailing direction of flow of the water. However, in operation, the system may be used to provide and maintain a head of water, that is hold the flow of water to provide a higher water level on the upstream side of the system than on the lower. In such a case, the angle of disposition relative to the normal direction of flow is not a significant factor in the operation of the system.

In general, when generating power, it is advantageous to have the head of water on the upstream side of the system as high as possible. In this respect, the system may be operated to first control the flow of water through the system, by limiting the speed of rotation of the rotor assemblies, so as to allow a sufficient head of water to build up on the upstream side of the installation. Thereafter, the rotor assemblies may be freed to rotate at the optimum speed for energy generation.

The system of the present invention comprises a generator assembly having first and second rotor assemblies. Each rotor assembly comprises a hub rotatable about a vertical axis. A plurality of vertical blades extend from the hub. In one embodiment, the hub may consist essentially of a shaft to which the blades are attached at their inner edges. Alternatively, the inner portion of each blade may be spaced from the axis of rotation of the hub, providing an annular cavity between the inner portions of the blades and the inner portion of the hub. The adjacent blades of the rotor assembly define between them a blade cavity. It has been found that water impinging on the rotor assembly and travelling in a direction substantially parallel to the rotor blades applies little or no force on the rotor assembly. This occurs when the rotor blades are passing through the position of pointing precisely upstream of the direction of water flow. With the blades in this position, water impinging on the rotor assembly flows into the cavities defined between the upstream blades and impacts the central hub of the rotor assembly. The water is trapped in this manner and loses its kinetic energy to the generator assembly forcing it in a downstream direction, rather than impart its kinetic energy to rotate the rotor blades. By allowing the water to leave the inner region of the blade cavity and flow into another blade cavity, the water retains its kinetic energy until it impinges on a rotor blade. The annular cavity in the hub provides a conduit through which water may flow from one blade cavity to another. In one arrangement, the hub comprises an inner hub portion and an outer hub portion, the outer hub portion extending concentrically around the inner hub portion, the impellor blades being mounted at their inner portions to the outer hub portion. The outer hub portion is provided with suitable openings and passages to allow water to flow between each blade cavity and the annular passage between the inner and outer hub portions. In a preferred arrangement, the inner hub is provided with one or more plates extending radially outwards therefrom, preferably circular plates. The inner edges of the blades are connected to the outer edges of the plates. The plates are spaced apart along the longitudinal axis of the inner hub, so as to define an annular cavity therebetween and radially inwards of the inner edges of the blades. Water may flow from the region between two adjacent blades, through the annular cavity, past the inner hub, and into a region between two adjacent blades downstream. In this way, water may be exchanged between blade cavities within a single rotor assembly and between the adjacent first and second rotor assemblies. This ensures that water flowing into a blade cavity does loses only minimal momentum, before impacting on the surface of a blade and imparting energy to the impellor.

In the situation where the system is to provide control of the water level upstream of the installation, it is preferred that the flow of water through the hub assembly from one blade cavity to another is not possible and is prevented. Alternatively, means should be provided for selectively opening and closing the openings and passages allowing the flow of water through the hub assembly.

As noted, the rotor assembly comprises a plurality of blades extending radially from the hub. The blades extend vertically parallel to the vertical axis of rotation of the rotor assembly. The blades may have any suitable form, for example may be curved in the radial direction and/or the longitudinal direction. In one preferred arrangement, the blades are substantially planar. More preferably, the substantially planar blades are provided with a curved portion at their radially inner edge and/or radially outer edge.

The system of the present invention may be deployed in open water, that is without a housing or the like surrounding the rotor assemblies. In such a case, the system may be employed to generate energy from the flow of water. More preferably, the rotor assemblies are disposed in a conduit, duct or channel, hereafter referred to as a conduit, through which the water is caused to flow. The conduit may be open, that is in the form of a channel extending, for example through a dam or barrage. Alternatively, the conduit may be closed, for example in the form of a pipe, tube or the like. The conduit has an inlet for water upstream of the rotor assemblies and an outlet for water downstream of the rotor assemblies. The conduit may be oriented at any suitable angle to the direction of flow of the water. Preferably, the conduit is arranged such that its longitudinal axis is parallel with the general direction of flow of the water.

The rotor assemblies may be arranged in any suitable orientation within the conduit. Preferably, the first and second rotor assemblies are arranged to extend on a line perpendicular to the longitudinal axis of the conduit, such that the flow of water through the conduit is perpendicular to the line of the rotor assemblies.

The conduit may have a width that is wider than the combined width of the first and second rotor assemblies, the conduit being used to direct a flow of water generally onto the rotor assemblies. However, in such an arrangement, water can flow past the rotor assemblies between the blades and the wall of the conduit. More preferably, the first and second rotor assemblies are arranged to extend across the width of the conduit, thereby presenting an obstacle to the flow of water along the conduit. In this way, the rotor assemblies can be used to present a barrier to the flow of water along the conduit, thus allowing the level of water on the upstream side of the installation to be controlled. In a preferred embodiment, the opposing walls of the conduit in the region adjacent the rotor assemblies are each provided with a seal assembly, which cooperates with the outer edges of the blades of the respective rotor assembly, whereby the outer edges of the blades can abut or contact the seal assembly to prevent the passage of water therebetween. If required, the outer edges of each blade may be provided with seals, such as flexible seals, to contact the seal assembly in the wall of the conduit.

In order to provide water level control, it is also necessary to provide a means for preventing when required the flow of water between the first and second rotor assemblies, in particular through the overlapping swept volume. In a preferred embodiment, the system is provided with means for preventing water entering the overlapping swept volume between the first and second rotor assemblies. In one arrangement, the system is provided with a seal assembly disposed upstream of the first and second rotor assemblies aligned with the overlapping swept volume, the seal assembly being contacted by the outer edges of the blades of the rotor assemblies. In the case of a system being employed to generate energy from tidal flows, where the direction of flow of water reverses, such a seal assembly is provided both upstream and downstream of the rotor assemblies.

As noted above, it has been found that water impinging on the rotor assemblies such that it flows parallel to a blade extending from the hub upstream imparts little to no force on the blade. In order to ensure that the maximum driving force is applied by the flowing water on the blades of the rotor assemblies, it is preferred to provide a flow guide upstream of the rotor assemblies, the flow guide having one or more surfaces to direct water to impinge on the upstream blades of the rotor assemblies at an angle to the general direction of flow of the water. Preferably, a single flow guide is disposed upstream of the first and second rotor assemblies aligned with the overlapping swept volume. The single flow guide comprises a respective guide surface to direct water to each of the first and second rotor assemblies. In one preferred arrangement, the flow guides also comprise the seal assemblies described hereinbefore. Again, for tidal flows, a flow guide is preferably disposed both upstream and downstream of the rotor assemblies.

The rotor assemblies are each connected to the drive side of a suitable system for generating energy. Suitable systems are known in the art and include generators for producing electrical energy and pumps for generating a stream of pressurised fluid, such as a hydraulic fluid or a gas, which may in turn be used to drive an electrical generator remote from the installation.

As noted hereinbefore, one preferred arrangement of the rotor assembly is to provide a hub having a cavity through which water can flow from one blade cavity of the rotor assembly to another. It has been found that this arrangement is advantageous when the rotor assemblies are employed together, as hereinbefore described, and also singularly.

Accordingly, in a further aspect, the present invention provides a system for the generation of energy from the flow of water, the system comprising:

a support assembly extending across at least a portion of the body of water;

a generator assembly mounted in the support assembly, the generator assembly comprising a rotor assembly the rotor assembly comprising a vertical hub rotatable about a vertical axis and a plurality of vertical blades extending radially from the hub, adjacent blades of the rotor assembly defining between them a blade cavity;

wherein the hub comprises a cavity through which water may flow from a first blade cavity of the rotor assembly to a second blade cavity of the rotor assembly through the hub.

The hub preferably comprises a cavity having openings into each blade cavity of the rotor assembly. As described hereinbefore, the cavity in the hub is preferably an annular cavity. In one arrangement, the hub comprises an inner hub portion and an outer hub portion, the outer hub portion extending concentrically around the inner hub portion, the impellor blades being mounted at their inner portions to the outer hub portion. The outer hub portion is provided with suitable openings and passages to allow water to flow between each blade cavity and the annular passage between the inner and outer hub portions. In a preferred arrangement, the inner hub is provided with one or more plates extending radially outwards therefrom, preferably circular plates. The inner edges of the blades are connected to the outer edges of the plates. The plates are spaced apart along the longitudinal axis of the inner hub, so as to define an annular cavity therebetween and radially inwards of the inner edges of the blades. Water may flow from the region between two adjacent blades, through the annular cavity, past the inner hub, and into a region between two adjacent blades downstream. In this way, water may be exchanged between blade cavities within the rotor assembly.

Further, as also noted above, one preferred arrangement of the system of the present invention is to provide two rotor assemblies with a flow guide disposed upstream thereof to direct the flow of water onto the upstream blades of the rotor assemblies at an angle for the most efficient rotation of the rotors.

Accordingly, in a further aspect, the present invention provides a system for the generation of energy from the flow of water, the system comprising:

a support assembly extending across at least a portion of the body of water;

a generator assembly mounted in the support assembly, the generator assembly comprising a first rotor assembly and a second rotor assembly, each rotor assembly comprising a vertical hub rotatable about a vertical axis and a plurality of vertical blades extending radially from the hub; and a flow guide disposed upstream of and between the two rotor assemblies, the flow guide having respective first and second guide surfaces for directing a flow of water onto the blades of each of the first and second rotor assemblies.

The first and second rotor assemblies may be arranged at any suitable angle to the incident flow of water, most preferably along a line substantially perpendicular to the general direction of flow of the water. The preferred arrangements for the first and second rotor assemblies are as described hereinbefore.

The first and second rotor assemblies are arranged adjacent one another and may be disposed to have their swept volumes overlapping, as hereinbefore described. The flow guide is disposed upstream of the two rotor assemblies and comprises a first guide surface directing a flow of water onto the upstream blades of the first rotor assembly and a second guide surface for directing a flow of water onto the upstream blades of the second rotor assembly. The first and second guide surfaces are disposed to extend at an angle to the general direction of flow of the incident water, such that each guide surface directs a flow of water onto the blades of its respective rotor assembly at an angle to the general direction of flow of water. It is preferred that the first and second guide surfaces are arranged symmetrically about the flow guide. The guide surfaces may have any suitable shape, with a generally concave shape being preferred.

In cases where the system is to be installed in a body of water subject to tidal flows, where the general direction of flow of the water is reversed during a normal tidal cycle, the system preferably comprises a flow guide both upstream and downstream of the rotor assemblies.

The rotor assemblies of the system may be disposed in open water. More preferably, they are disposed in a conduit, most preferably along line substantially perpendicular to the longitudinal axis of the conduit and the general direction of flow of water therealong. As described hereinbefore, the flow guide or, in the case of an arrangement with multiple flow guides, each flow guide may also be provided to be contacted by or engage with the outer edges of the blades of each rotor assembly, such that a seal is formed with the outer edge of the blades. In this way, the rotation of the rotor assemblies may be controlled or prevented, to control or prevent the flow of water along the conduit and control the level of water on the upstream side of the system. Appropriate seal assemblies will be required to prevent the flow of water between each rotor assembly and the respective wall of the conduit, as described above.

In one preferred embodiment of the systems of the present invention described hereinbefore, the position of the blades of the rotor assemblies are fixed relative to the hub, that is the blades are rigidly connected to the hub or hub assembly. However, in certain applications, it has been found advantageous to have the blades pivotably mounted to the hub or hub assembly. In particular, it has been found that by having the blades pivotably mounted to the hub increases the torque generated on the rotor assembly, in turn increasing the energy generating efficiency of the system.

Accordingly, in a further aspect, the present invention provides a system for the generation of energy from the flow of water, the system comprising:

a support assembly extending across at least a portion of the body of water;

a generator assembly mounted in the support assembly, the generator assembly comprising a rotor assembly the rotor assembly comprising a vertical hub rotatable about a vertical axis and a plurality of vertical blades extending radially from the hub;

wherein the blades are pivotably mounted to the hub and moveable between an extended position and a retracted position as the rotor assembly rotates.

The general features of the support assembly and the generator assembly are as hereinbefore described. The system of this aspect of the invention comprises a generator assembly having a rotor assembly in which the blades are moveable with respect to the hub of the rotor assembly. In particular, the blades are pivotably mounted to the hub at their radially inner edges. The pivotal mounting may be any suitable means that allows the blades to rotate in a substantially vertical axis about the mounting with respect to the hub. The blades are moveable about the pivot between a retracted position and an extended position. In moving between the retracted and extended positions, the radially outer edge of the blade moves along an arc.

In one embodiment, the blades are free-moving about the pivotal mounting and are free to be acted upon by the flow of water. In this embodiment, the blades are mounted such that they approach the position upstream of the hub in the retracted position and the action of the water impinging upon the blade moves the blade from the retracted to the extended position as it passes through the upstream position. In this respect, the term 'upstream position' is a reference to the position of the blade when directly upstream of the hub in the general direction of flow of the water. The term 'downstream position' is to be similarly interpreted. In this embodiment, the blades are preferably caused to move from the extended position to the retracted position as they pass through a position downstream of the hub. Preferably, the blades are caused to impinge on a guide surface as they pass the downstream position with respect to the hub, forcing the blades to move from the extended position to a retracted position.

In one preferred embodiment, the rotor assembly is disposed adjacent a guide surface, such that as the rotor assembly rotates, the blades, most preferably the outer edge portions of the blades, contact the guide surface and are urged from the extended position to the retracted position. The guide surface is preferably disposed so as to be contacted by the blades of the rotor assembly once they have passed the downstream position and to urge the blades into the retracted position before they reach the upstream position. In one embodiment, the guide surface preferably extends from a substantially downstream position relative to the hub and terminates at a position before the upstream position, in the direction of rotation of the rotor assembly.

The system may comprise one or more flow guides, as hereinbefore described. In one embodiment, the guide surfaces contacted by the blades as the rotor assembly rotates are provided on the flow guide.

The rotor assembly may be disposed in open water. However, as noted hereinbefore, the rotor assembly is preferably disposed in a conduit, with the water flowing along the conduit to impinge on the blades of the rotor assembly. The rotor assembly may be disposed centrally in the conduit. Alternatively, the rotor assembly is disposed eccentrically in the conduit, that is closer to one side wall of the conduit than the opposing side wall. In a preferred embodiment, the rotor assembly is disposed eccentrically between a first guide surface and a second guide surface on opposing sides of the conduit, the rotor assembly being free to rotate between the two guide surfaces with the outer edge portions of the blades contacting the first and second guide surfaces as the rotor assembly rotates. The rotor assembly is disposed relative to the first guide surface such that the blades may move past the first guide surface in the extended position and are urged into the retracted position by the second guide surface, as hereinbefore described. In this way, by having the outer edges of the blades contact the first and second guide surfaces, the rotation of the rotor assembly may be controlled or stopped, thus allowing the water level upstream of the system to be controlled.

In an alternative to having the blades free to pivot relative to the hub under the action of the flow of water and/or one or more guide surfaces, the position of the blades about the pivotal mount may be controlled by a suitable means. Any suitable means to control the position of the blades during the rotation of the rotor assembly may be used. In one preferred embodiment, the position of each blade is controlled by a cam acting on each blade. In one arrangement, each blade is provided with a lever extending therefrom to be contacted by the cam. The contact with the cam may be direct or indirect, for example through a connecting rod or other linkage. In one preferred arrangement, the cam is disposed on a stationary cam wheel.

The vertical blades of the rotor assembly may have any suitable configuration, for example substantially flat or planar blades or curved.

As noted hereinbefore, the systems of the present invention may be arranged to allow the water level upstream of the system to be controlled.

This is achieved by positioning the blades of the rotor assemblies so as to contact the opposing side walls of a conduit and prevent the flow of water along the conduit.

Accordingly, in a further aspect, the present invention provides a system for the control of the water level upstream of the system, the system comprising:

a conduit through which the water may flow;

a rotor assembly disposed in the conduit, the rotor assembly comprising a vertical hub rotatable about a vertical axis and a plurality of vertical blades extending radially from the hub;

the conduit comprising first and second opposing surfaces contacted by the radially outer edge regions of each blade as the rotor assembly rotates, whereby there is at least one position of the rotor assembly when a blade is in contact with each of the first and second opposing surfaces;

means for controlling the speed of rotation of the rotor assembly.

The features of the rotor assembly and the blades thereof may be as hereinbefore described.

As noted, the blades are arranged on the rotor assembly and the conduit arranged such that there is at least one position in which the first opposing surface is contacted by a first blade of the rotor assembly and the second opposing surface is contacted by a second blade of the rotor assembly. In this position, the rotor assembly presents a barrier to the flow of water along the conduit. Thus, limiting the speed of rotation of the rotor assembly to be lower than the speed of rotation if rotating freely under the action of the incident flow of water causes the water level on the upstream side of the rotor assembly to increase, or allows the upstream water level to be controlled at a specific level. To achieve the most rapid increase in the upstream water level, the rotor assembly may be locked in the aforementioned position.

The means for controlling the speed of rotation of the rotor assembly may be any suitable means to reduce or limit the speed of rotation, for example a brake acting upon the hub of the rotor assembly or a variable speed energy take-off system as hereinbefore described, to vary the resistance of rotation of the rotor assembly. The means for controlling the speed of rotation of the rotor assembly may also comprise a means for generating energy from the rotation of the rotor assembly. Engagement of the means for generating energy will act to reduce the speed of rotation of the rotor assembly. Alternatively, or in addition thereto, the system may be provided with a drive means, for providing a rotational drive to the rotor assembly, thereby allowing the rotor assembly to be driven at a higher speed of rotation than if rotating freely under the action of the flowing water. In such a case, the rotor assembly acts to displace or pump water from the upstream side to the downstream side, thereby reducing the level of water on the upstream side of the rotor assembly. For example, this allows an upstream body of water fed by a river to be maintained at a desired level even at variable downstream water levels, such as a spring tide, when the downstream water level may even be higher than the desired upstream level.

The present invention also provides in a still further aspect a method for controlling the water level of a flowing body of water, the method comprising:

providing an obstacle to the flow of water;

providing a conduit in the obstacle for the passage of water therethrough;

providing a rotor assembly in the conduit, the rotor assembly comprising a vertical hub rotatable about a vertical axis and a plurality of vertical blades extending radially from the hub;

the conduit comprising first and second opposing surfaces contacted by the radially outer edge regions of each blade as the rotor assembly rotates, whereby there is at least one position of the rotor assembly when a blade is in contact with each of the first and second opposing surfaces; and controlling the speed of rotation of the rotor assembly.

As noted above, the controlling of the speed of rotation of the rotor assembly may comprise generating energy from the rotation of the rotor assembly.

As described hereinbefore, the systems of the present invention are suitable for installation in a barrage or dam extending across a flowing body of water, such as a river, estuary or the like.

Accordingly, in a further aspect, the present invention provides a barrage extending in a flowing body of water, the barrage comprising one or more conduits therethrough for allowing the passage of water through the barrage, the or each conduit being provided with a generator assembly comprising a rotor assembly;

the rotor assembly comprising a vertical hub rotatable about a vertical axis and a plurality of vertical blades extending radially from the hub.

The barrage is an installation preferably extending across the body of water and secured to the bed of the body of water. Such installations, in particular dams and the like, are known in the art. Most preferably, the barrage is provided with a plurality of conduits, each provided with one or more of the said rotor assemblies. The rotor assemblies may be arranged to control the level of water on the upstream side of the barrage and/or generate energy from the flow of water through the conduits in the barrage.

Features of the rotor assembly may be as hereinbefore described.

In a preferred arrangement, the rotor assemblies are provided in modules, each module comprising a support assembly releasably mounted to the installation, whereby each module may be removed from the installation, for example to allow for the rotor assembly to be serviced, repaired or replaced.

Embodiments of the present invention will now be described, by way of example only, having reference to the accompanying drawings, in which.

Figure 1:
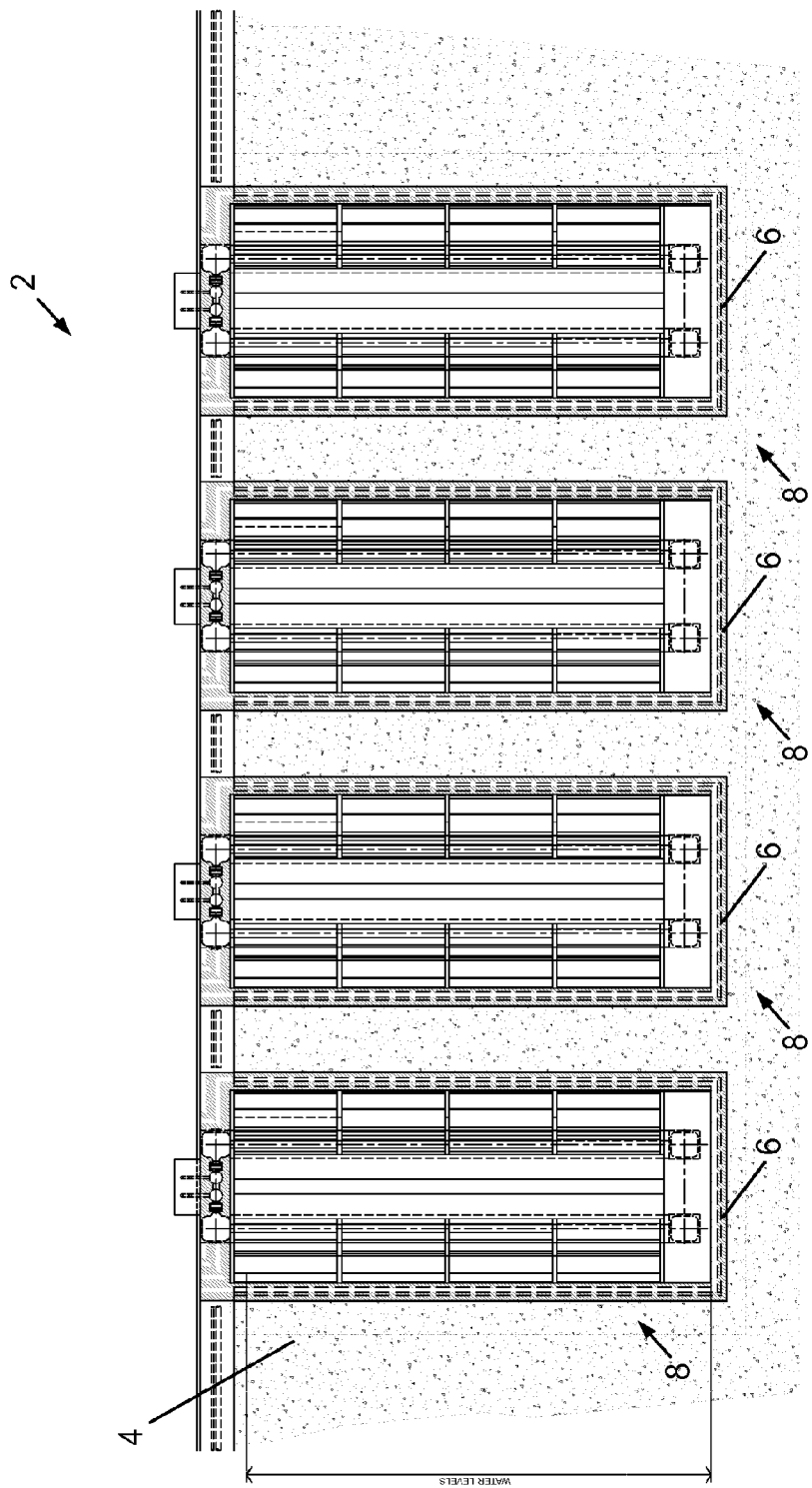
FIG. 1 is a front view from an upstream position of a barrage according to one embodiment of the present invention.

Referring to FIG. 1, there is shown a barrage, generally indicated as 2, extending across a flowing body of water as viewed from an upstream position. The barrage 2 extends across the body of water and presents an obstacle or dam to the normal flow of water. The body of water may be a river, river estuary or other body of water in which a flow or current occurs, for example a tidal flow.

The barrage 2 comprises a support structure, preferably a concrete support structure 4 extending from the bed of the body of water in a conventional manner. The barrage 2 comprises a plurality of conduits 6 formed therein as generally rectangular channels extending through the barrage from the upstream side to the downstream side in a direction generally parallel to the normal direction of flow of the water. Each conduit 6 houses a generator assembly 8.

Figure 2:
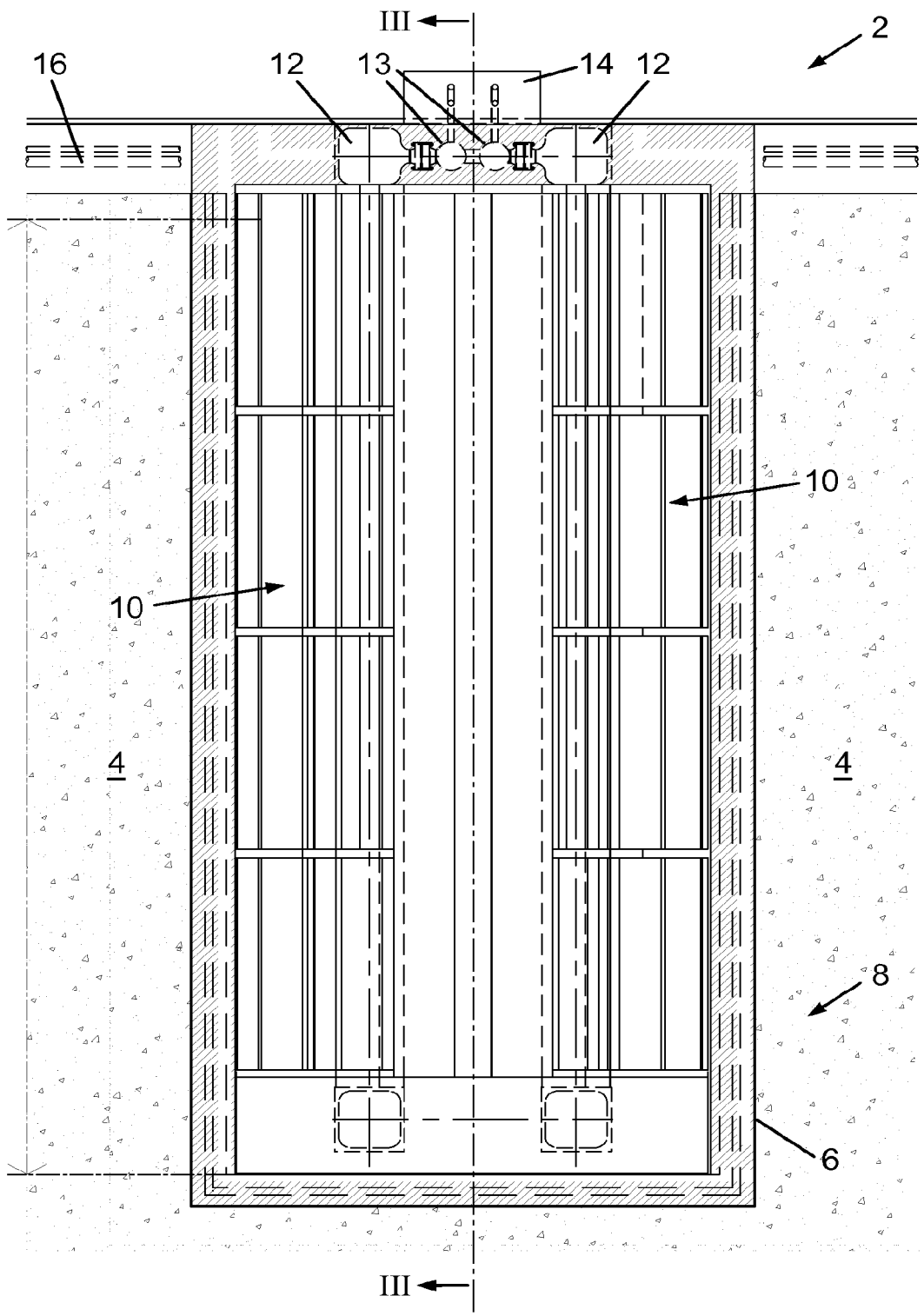
FIG. 2 is a front view from an upstream position of a single generator assembly in the barrage of FIG. 1.
Figure 3:
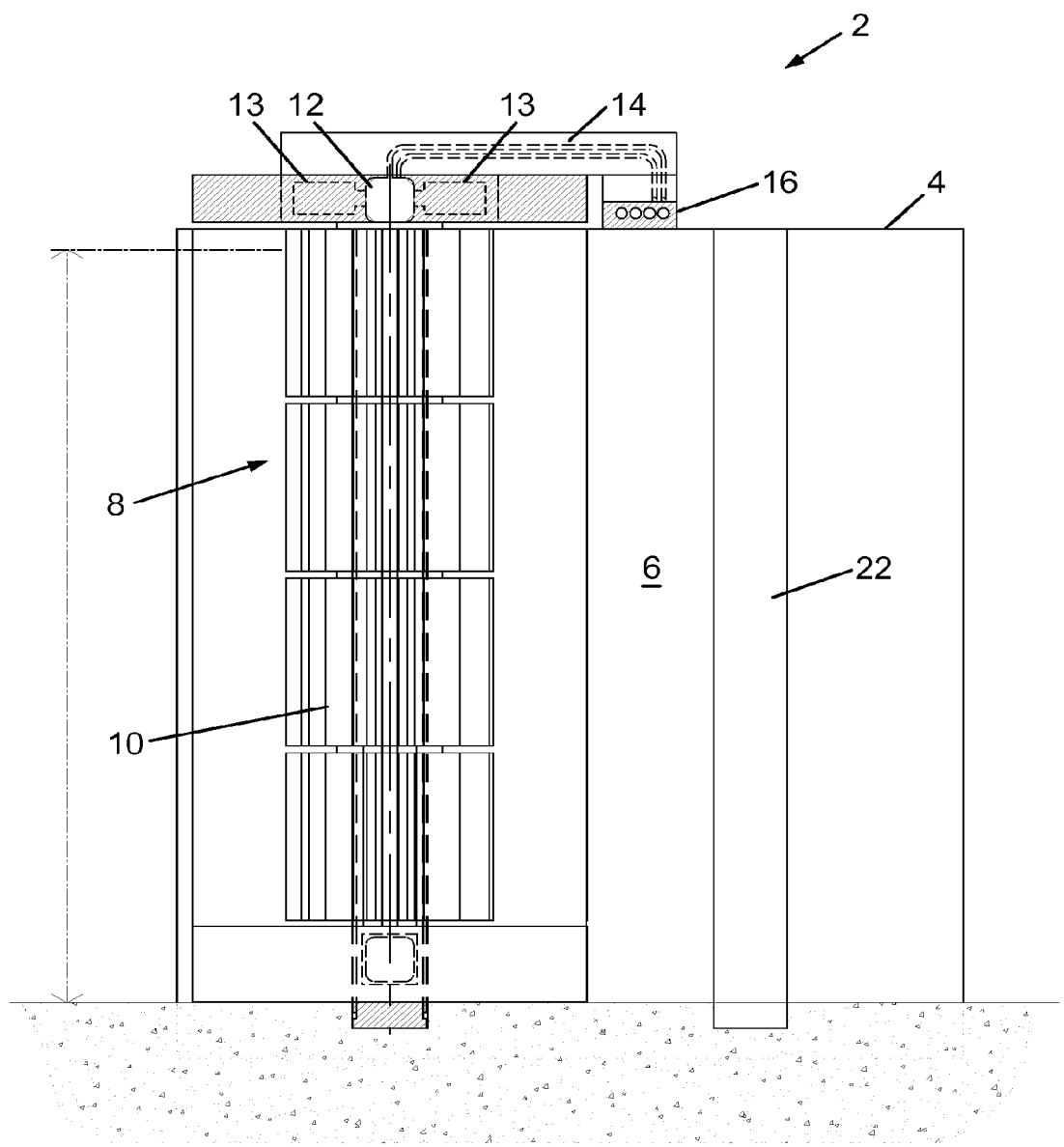
FIG. 3 is a cross-sectional view through the barrage of FIG. 2 along the line III-III.

The general arrangement of a single generator assembly 8 within a conduit 6 is shown in more detail in FIG. 2, again from the upstream side of the barrage 2, and in FIG. 3 viewed in cross-section through the barrage. The generator assembly 8 comprises a pair of rotor assemblies 10 arranged side by side and extending laterally across the conduit 6 along a line generally perpendicular to the longitudinal axis of the conduit and the general direction of flow of water. Specific embodiments of the rotor assemblies and their arrangement within the conduit are described in more detail below. The generator assembly 8 further comprises gear boxes 12 driven by the rotation of the respective rotor assembly and connected to generators 13. The generators 13 may be any suitable means for generating energy from the rotation of the rotor assembly, such as a pump to generate a pressurised stream of hydraulic fluid as shown. Other generators include electrical generators. The barrage 2 is further provided with a piping and cantilever assembly 14 and piping causeway 16 for supporting pipes, control lines, power lines and the like.

Figure 4:
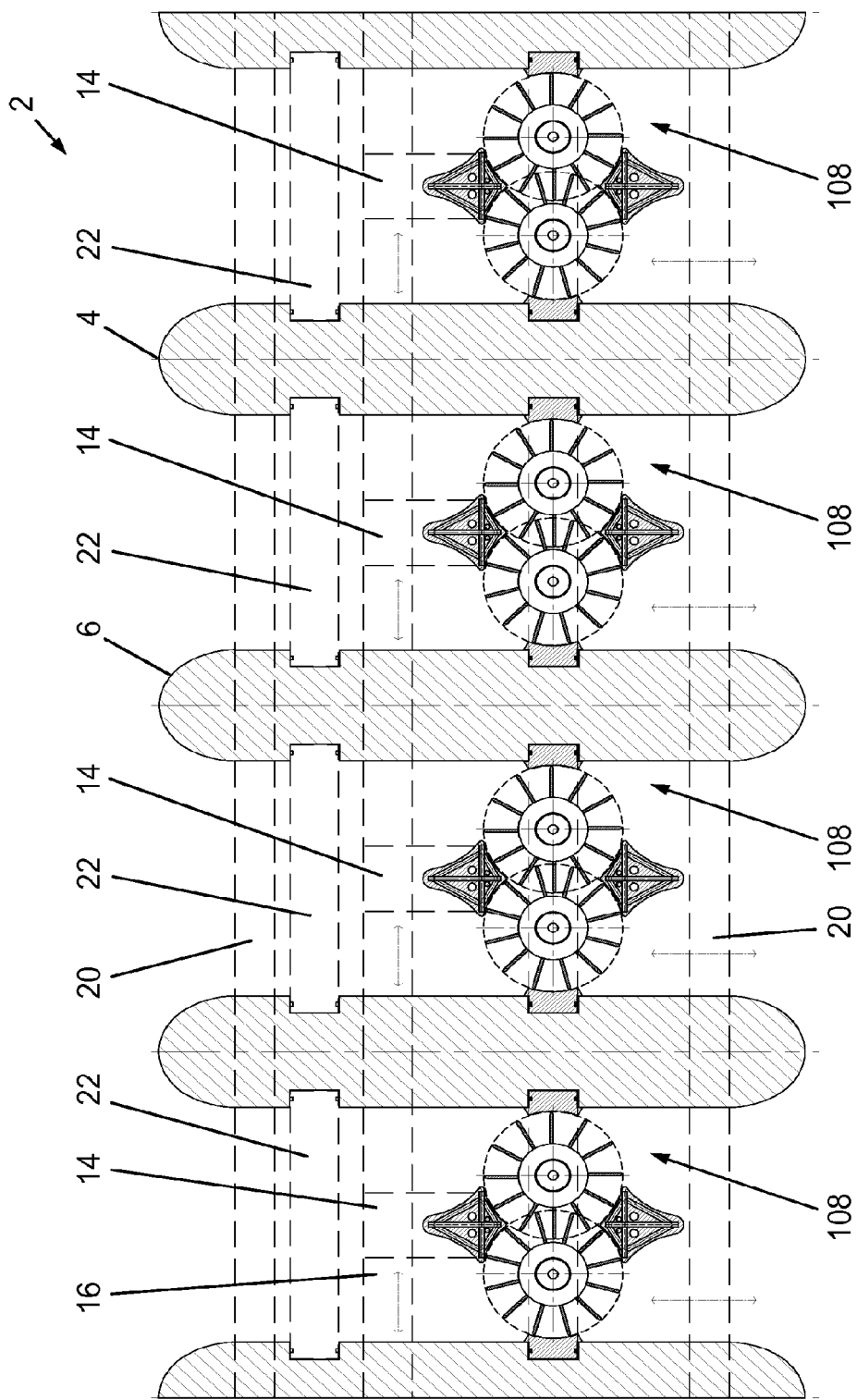
FIG. 4 is a plan view of a barrage of the general type of FIG. 1 with a first embodiment of generator assembly.

Referring to FIG. 4, there is shown a plan view of a barrage of the general type shown in FIG. 1 and described above housing generator assemblies 108 of one preferred embodiment of the present invention. The generator assemblies 108 are disposed in conduits 6 extending through the barrage 2, as described above.

As shown in FIG. 4, the barrage 2 comprises rail and walkways 20 extending along the upper section of the barrage to provide access to each generator assembly. Each conduit 6 is provided with a vertical gate 22 at its upstream end, to allow the conduit to be closed to the flow of water when maintenance or replacement of the respective generator assembly is required. A gate may be provided at each end of the conduit allowing the conduit to be closed to the flow of water from the upstream and/or downstream directions, as required.

Figure 5:
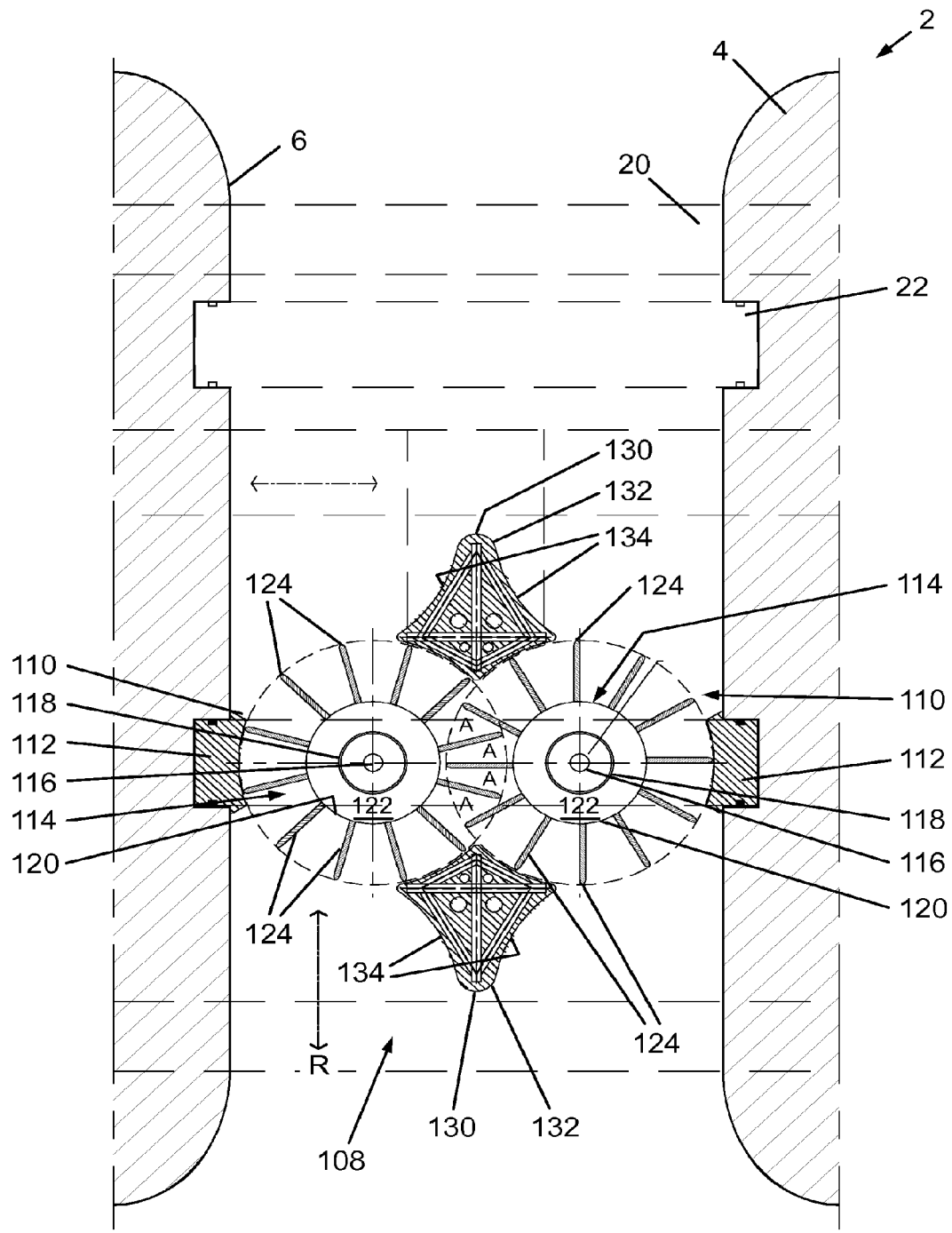
FIG. 5 is a plan view of a single generator assembly of the barrage of FIG. 4.

A single generator assembly 108 is shown in plan view in FIG. 5. As shown in FIG. 5, the generator assembly 108 comprises two rotor assemblies 110 arranged side-by-side laterally across the conduit 6 between two seal assemblies 112 arranged on opposing sides of the conduit. Each rotor assembly 110 comprises a vertically extending hub assembly 114 comprising an arrangement of tubular plates, the hub assembly having a central shaft 116, about which extends an inner hub 118, formed from a first tubular plate, and a plurality of circular plates 120, defining between them an annular cavity 122 radially inwards of the inner edges of the blades. The shaft 116 is connected to the gear boxes 12 such that rotation of the shaft provides drive for the generator 13, either directly or through a suitable gear assembly (not shown for clarity).

Each rotor assembly 110 further comprises a plurality of vertically extending blades 124 rigidly mounted to the outer hub 120 and extending radially therefrom. In the embodiment shown in FIG. 5, the blades are straight and planar. The region defined between adjacent blades 124 and the respective outer portion of the plates 120 is herein referred to as a blade cavity. The spaced apart plates 120 provide openings, such that water may leave a first blade cavity, flow through the annular cavity 122 in the hub assembly and into a second blade cavity. In this way, the inertia of water entering a blade cavity parallel to the adjacent blades is not lost and may be directed to impinge on a blade downstream.

As shown in FIG. 5, the rotor assemblies 110 are disposed such that the region swept by the blades of one rotor assembly overlaps the region swept by the blades of the second rotor assembly. This region is denoted as A in FIG. 5. The rotor assemblies 110 are further arranged such that the outer edges of the blades 124 contact the respective seal assembly 112 in the wall of the conduit 6. In this way, water is prevented from passing the rotor assemblies without impinging on a blade and providing drive to rotate the rotor assembly.

The general arrangement shown in FIG. 5 is of particular use in tidal flows of water, the direction of the tidal flows being indicated by the arrow R. It will be noted that the direction of flow of water through the conduit 6 reverses during the tidal cycle.

Figure 5A:
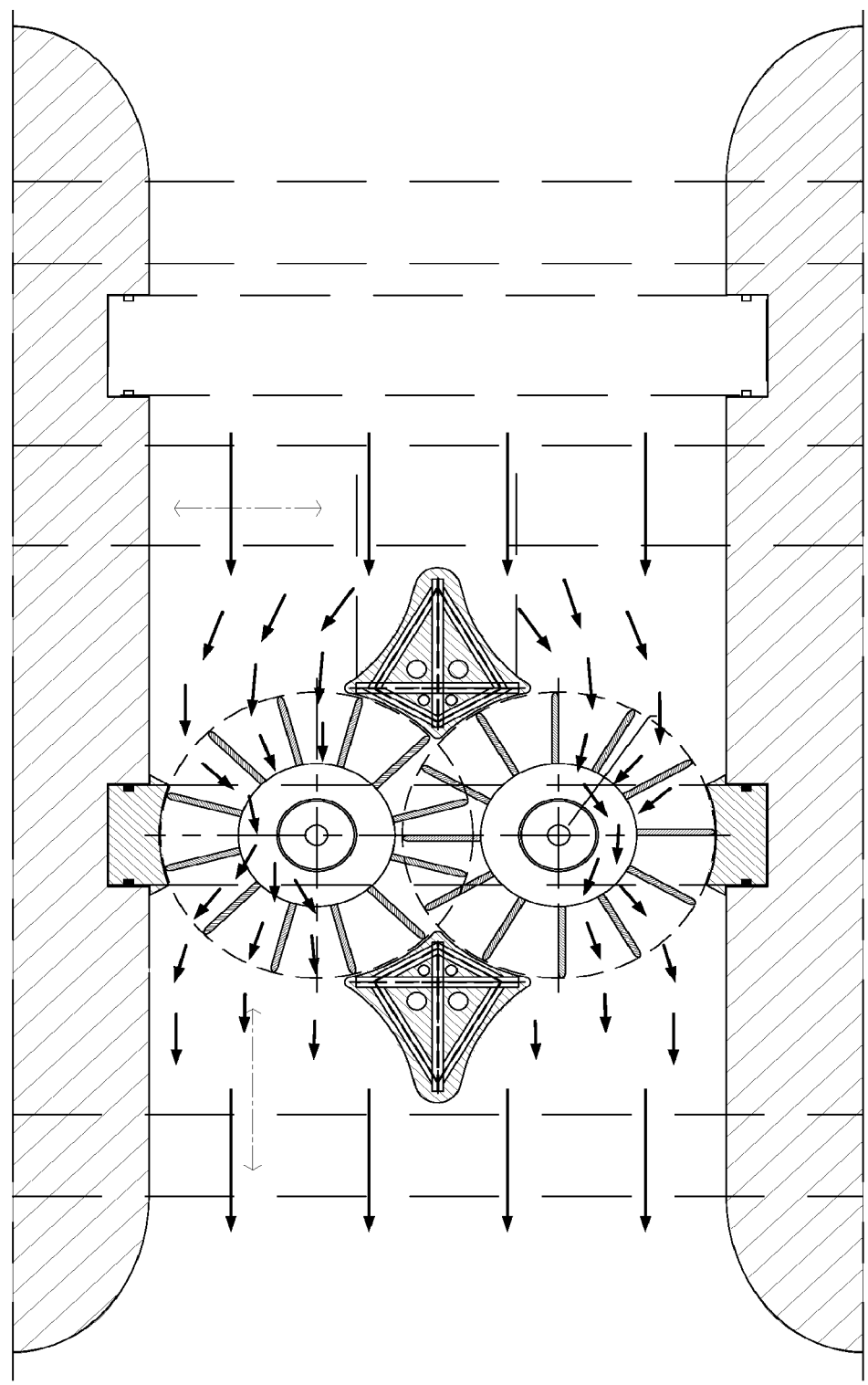
FIG. 5A is the same view as FIG. 5 showing the flow pattern of water through the assembly, under typical operating conditions.

FIG. 5A shows the pattern of flow of water through the conduit and the rotor assembly under typical operating conditions.

A flow guide 130 is disposed centrally within the conduit at both the upstream and downstream sides of the rotor assemblies 110. Each flow guide is generally aligned with the longitudinal axis of the conduit 6 and axially of the region A between the rotor assemblies 110. Each flow guide comprises a generally rounded nose 132 distal from the rotor assemblies 110, bounded on each side by a generally concave flow surface 134 arranged to direct incident water onto the blades of the adjacent rotor assembly at an angle to the longitudinal axis of the conduit and the general direction of flow of water. The flow guides 130 are disposed to be contacted by the outer edges of the blades of the rotor assemblies 110 as they rotate and are provided with appropriately curved surfaces facing the rotor assemblies, to prevent substantial flows of water between the blades and the flow guides. In this way, the major portion of the flow of water through the conduit is directed onto the blades of the rotor assemblies laterally outwards of the flow guides and the rotor hubs, thereby generating the maximum rotation of the rotor assemblies.

Figure 6:
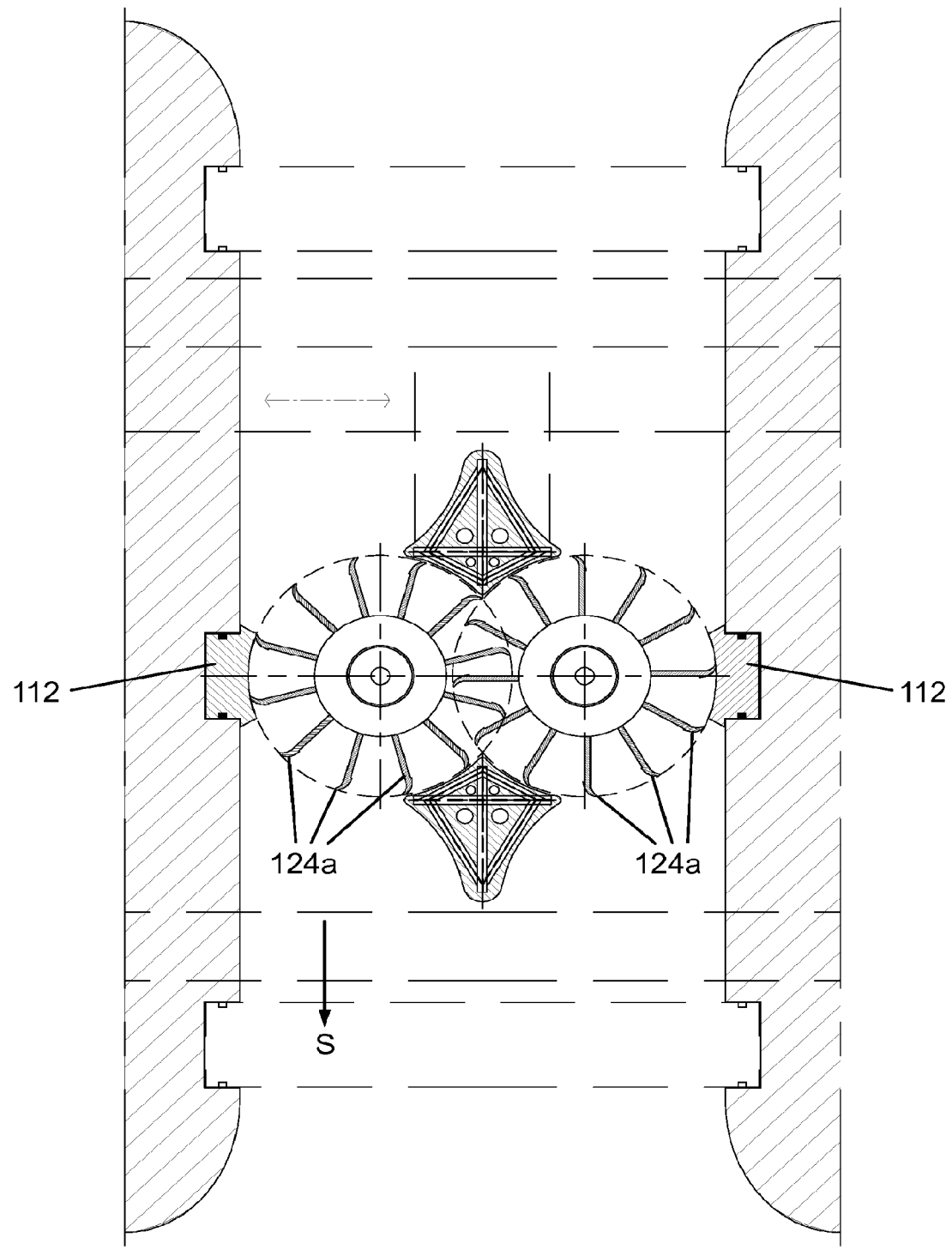
FIG. 6 is a plan view of a single generator assembly of the barrage of FIG. 4 employing an alternative blade configuration.

Referring to FIG. 6, an installation of the general type of FIG. 5 is shown, but employing blades 124*a* of a different configuration. As shown in FIG. 6, the blades 124*a* are curved at their outer edge region. The general direction of flow of water through the conduit is indicated by the arrow S with the upstream end of the conduit 6 being at the top of FIG. 6. The blades 124*a* are oriented such that the outer edge portions curve towards the upstream direction when the blades are extended laterally outwards and the outer edges of the blades are adjacent the seal assemblies 112. In all other respects, the installation of FIG. 6 is that same as shown in FIG. 5 and reference is made to the description above.

Should the assemblies of FIGS. 5 and 6 be required to control the level of water upstream of the barrage, means may be provided to control the speed of rotation of the rotor assemblies, in particular to increase their resistance to rotation, thus reducing their speed of rotation, or to lock the rotor assemblies using a braking system, a take-off system with variable gearing, or the like. In this way, the flow of water past the rotor assemblies is limited or prevented, allowing the level of water on the upstream side of the barrage to increase. In this case, the flow of water through the annular cavity in the hub assembly will be hindered.

Figure 7:
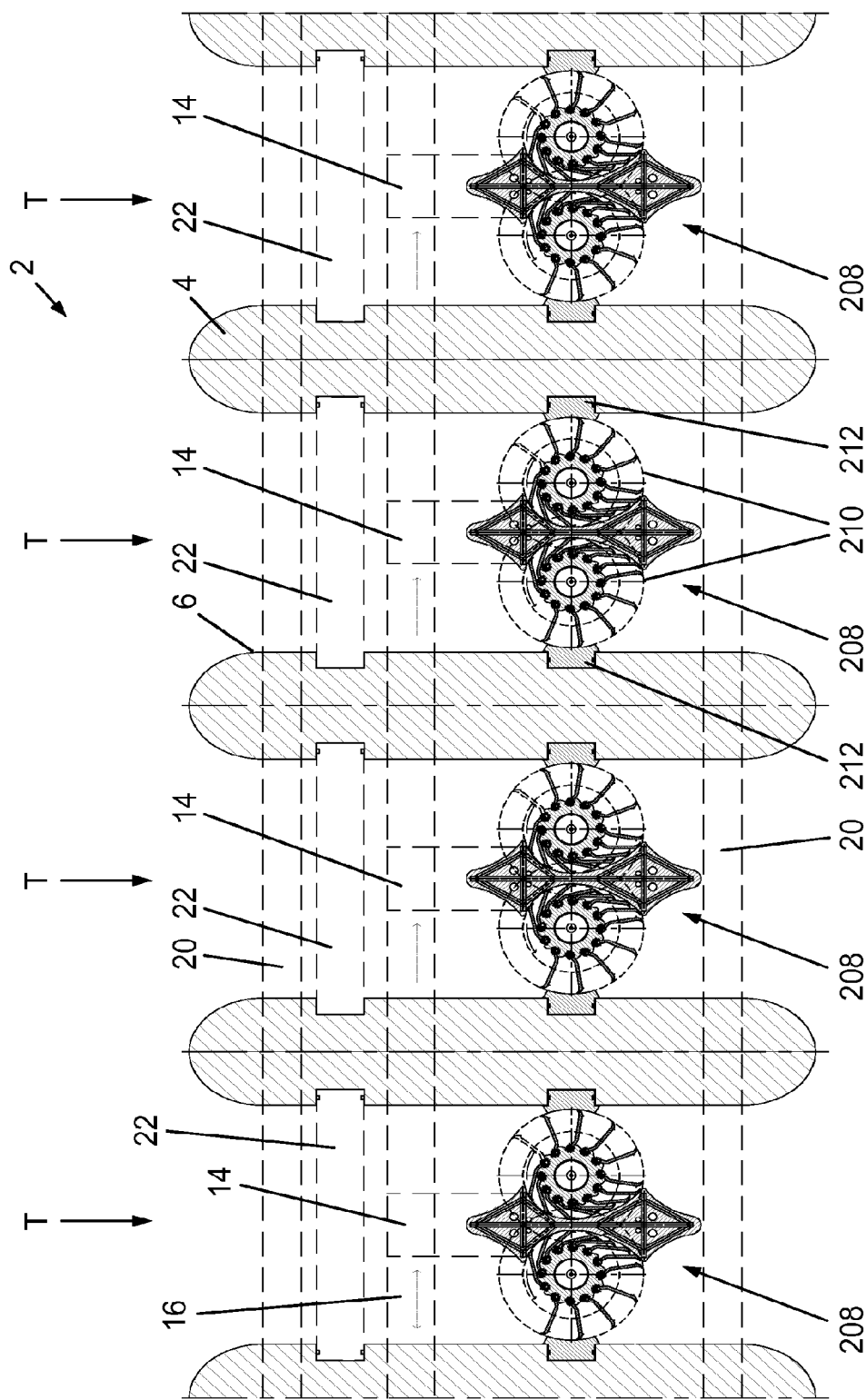
FIG. 7 is a plan view of a barrage of the general type of FIG. 1 with a second embodiment of generator assembly.

Referring to FIG. 7, there is shown a plan view of a barrage of the general type shown in FIG. 1 and described above housing generator assemblies 208 of a second preferred embodiment of the present invention. The generator assemblies 208 are disposed in conduits 6 extending through the barrage 2, as described above.

The general direction of flow of water is indicated by arrows T in FIG. 7.

Figure 8:
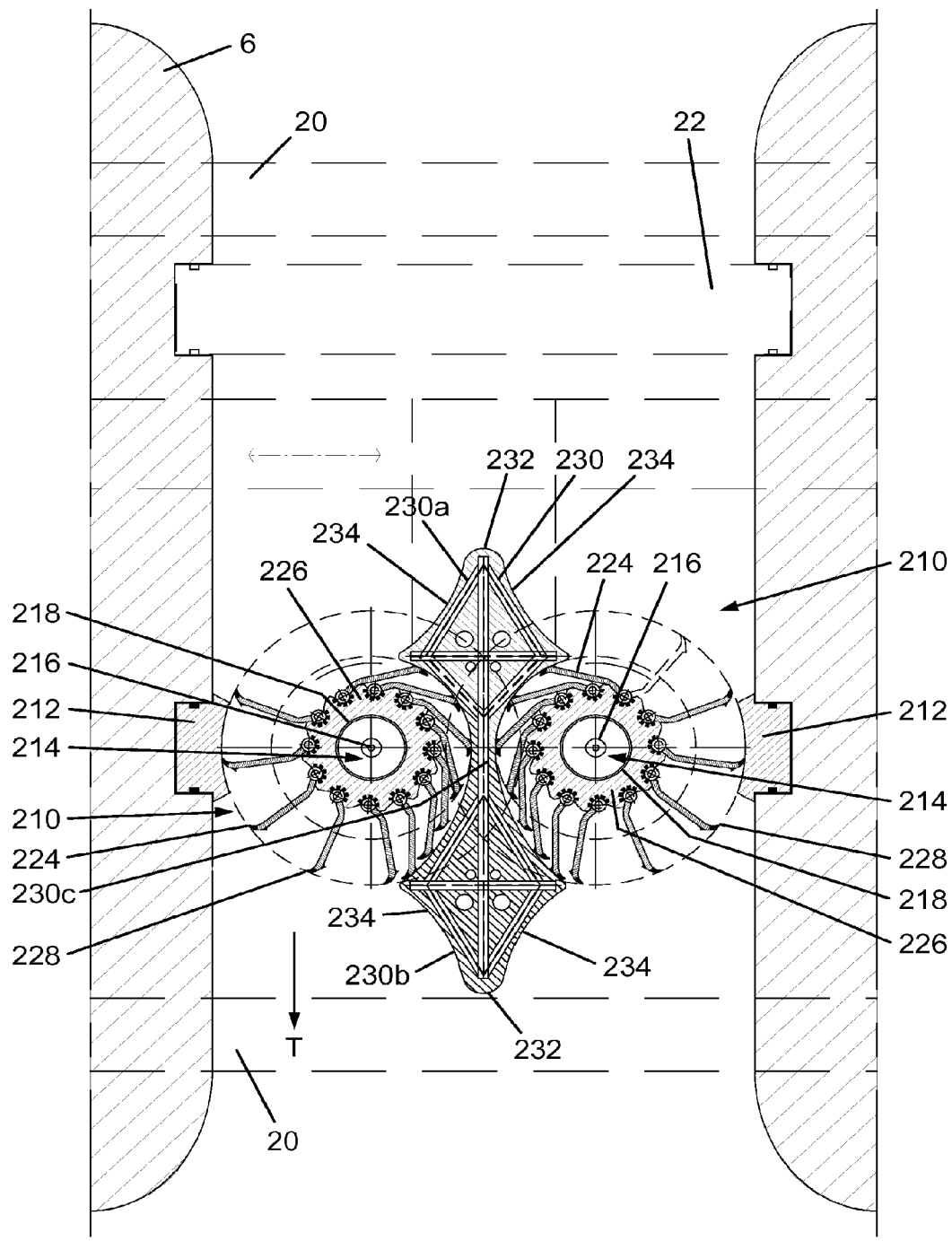
FIG. 8 is a plan view of a single generator assembly of the barrage of FIG. 7.

A generator assembly 208 of the barrage of FIG. 7 is shown in FIG. 8. As shown in FIG. 8, the generator assembly 208 comprises two rotor assemblies 210 arranged side-by-side laterally across the conduit 6 between two seal assemblies 212 arranged on opposing sides of the conduit. Each rotor assembly 210 comprises a vertically extending hub assembly 214, the hub assembly having a central shaft 216, about which extends a hub 218. The shaft 216 is connected to the gearbox 12 such that rotation of the shaft provides drive for the generator 13, either directly or through a suitable gear assembly (not shown for clarity).

Each rotor assembly 210 further comprises a plurality of vertically extending blades 224 mounted to the hub assembly 214 and extending radially therefrom. The hub assembly 214 further comprises an upper, generally circular hinge plate 226 and a lower hinge plate (not visible in FIGS. 7 and 8). Each blade 224 is pivotally mounted by a hinged connection to the upper hinge plate 226 and the lower hinge plate. The hinged connection is such as to allow the blade to pivot freely about the hinge plates under the action of the incident water and rotation of the hug assembly 214. The hinge plates are shaped to allow each blade 224 to pivot inwards towards the hub assembly 214 in a first direction and to restrain each blade in a fully extended position in the opposite direction. In this way, the blades are confined to rotate about the hinge plate between a fully extended position and a fully retracted position. The motion of the blades in operation is described in more detail below.

Each blade 224 is substantially flat or planar, having its inner portion curved, as shown in the plan view in FIG. 8. In addition, each blade is provided with a flexible seal 228 along its outer edge.

The general arrangement shown in FIGS. 7 and 8 is of particular use in river flows of water, the direction of the river flow being indicated by the arrow T. It will be noted that the direction of flow of water through the conduit 6 is generally in the single direction indicated by the arrow T.

A flow guide 230 is disposed centrally within the conduit extending from the upstream side of the rotor assemblies 210 to the downstream side. The flow guide 230 is generally aligned with the longitudinal axis of the conduit 6 between the rotor assemblies 210. The flow guide 230 comprises an upstream guide portion 230a and a downstream guide portion 230b, each having a generally rounded nose 232 distal from the rotor assemblies 210, bounded on each side by a generally concave flow surface 234 arranged to direct incident water onto the blades of the adjacent rotor assembly at an angle to the longitudinal axis of the conduit and the general direction of flow of water. A central guide portion 230c extends longitudinally between the upstream guide portion 230a and the downstream guide portion 230b.

The flow guide 230 is disposed to be contacted by the outer edges of the blades 224 of the rotor assemblies 210 as they rotate. The flow guide 230 is provided with appropriately curved surfaces facing the rotor assemblies, to prevent substantial flows of water between the blades 224 and the flow guide 230. In this way, the major portion of the flow of water through the conduit is directed onto the blades of the rotor assemblies laterally outwards of the flow guides and the rotor hubs, thereby generating the maximum rotation of the rotor assemblies. Further, the surfaces of the flow guide 230, in particular the surfaces of the central guide portion 230c and the adjacent surfaces of the upstream and downstream guide portions 230a and 230b facing the rotor assemblies 210 are shaped to act as guides for the rotor blades 224. As shown in FIG. 8, each rotor assembly 210 is located eccentrically between the flow guide 230 and the respective seal assembly 212. As the rotor assemblies 210 rotate, the blades 224 contact the downstream guide portion 230b and are folded inwards into the fully retracted position as they pass from the downstream side to the upstream side of the flow guide 230, thereby expelling the majority of the water from between the adjacent blades. In the retracted position, the blades have a lower moment of torque acting on the rotor assembly. As the rotor assembly 210 rotates and the blades 244 leave the guide surface of the upstream guide portion 230a, water flowing along the conduit 6 impinges on the blade surface, in part directed by the concave flow surface 234, causing the blade to move from the retracted position to the extended position, providing a higher moment of torque to the rotor assembly. The rotor assembly 210 thus rotates with the blades passing the respective seal assembly 212 in the fully extended position, the seals on the outer edges of the blades making contact with the surface of the seal assembly.

Should the assemblies of FIGS. 7 and 8 be required to control the level of water upstream of the barrage, means may be provided to control the speed of rotation of the rotor assemblies, in particular a variable gearing take-off system to increase their resistance to rotation, thus reducing their speed of rotation, or to lock the rotor assemblies using a braking system or the like. In this way, the flow of water past the rotor assemblies is limited or prevented, allowing the level of water on the upstream side of the barrage to increase and be controlled.

Figure 9:
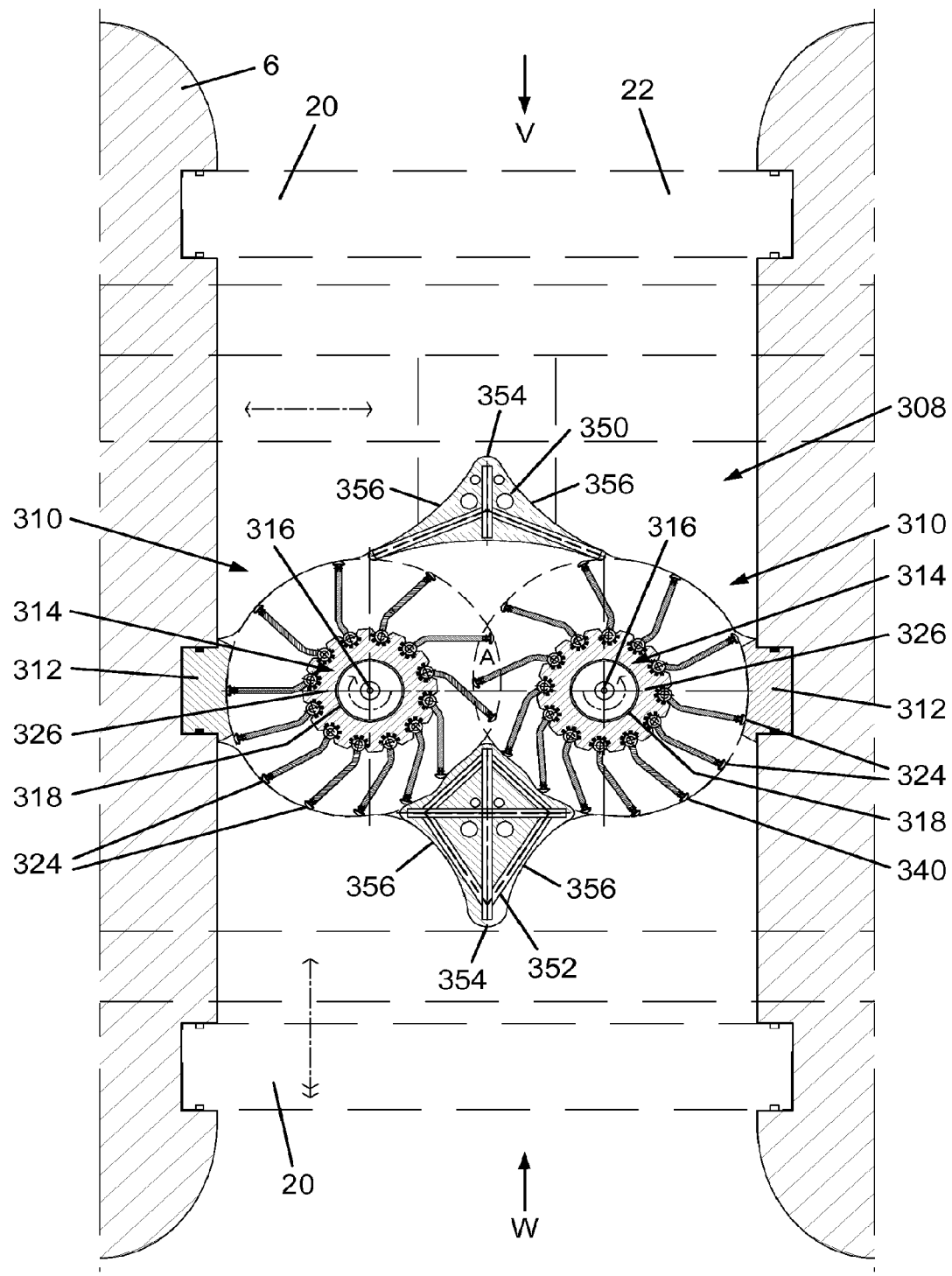
FIG. 9 is a plan view of a single generator assembly of an alternative design for use in the barrage of FIG. 7.

Referring to FIG. 9, there is shown in plan view a single generator assembly 308 of an alternative embodiment to that shown in FIG. 8, for use in a general arrangement as shown in FIG. 7. As shown in FIG. 9, the generator assembly 308 comprises two rotor assemblies 310 arranged side-by-side laterally across the conduit 6 between two seal assemblies 312 arranged on opposing sides of the conduit. Each rotor assembly 310 comprises a vertically extending hub assembly 314, the hub assembly having a central shaft 316, about which extends a hub 318. The shaft 316 is connected to the gearbox 12 such that rotation of the shaft provides drive for the generator 13, either directly or through a suitable gear assembly (not shown for clarity).

Figure 10:
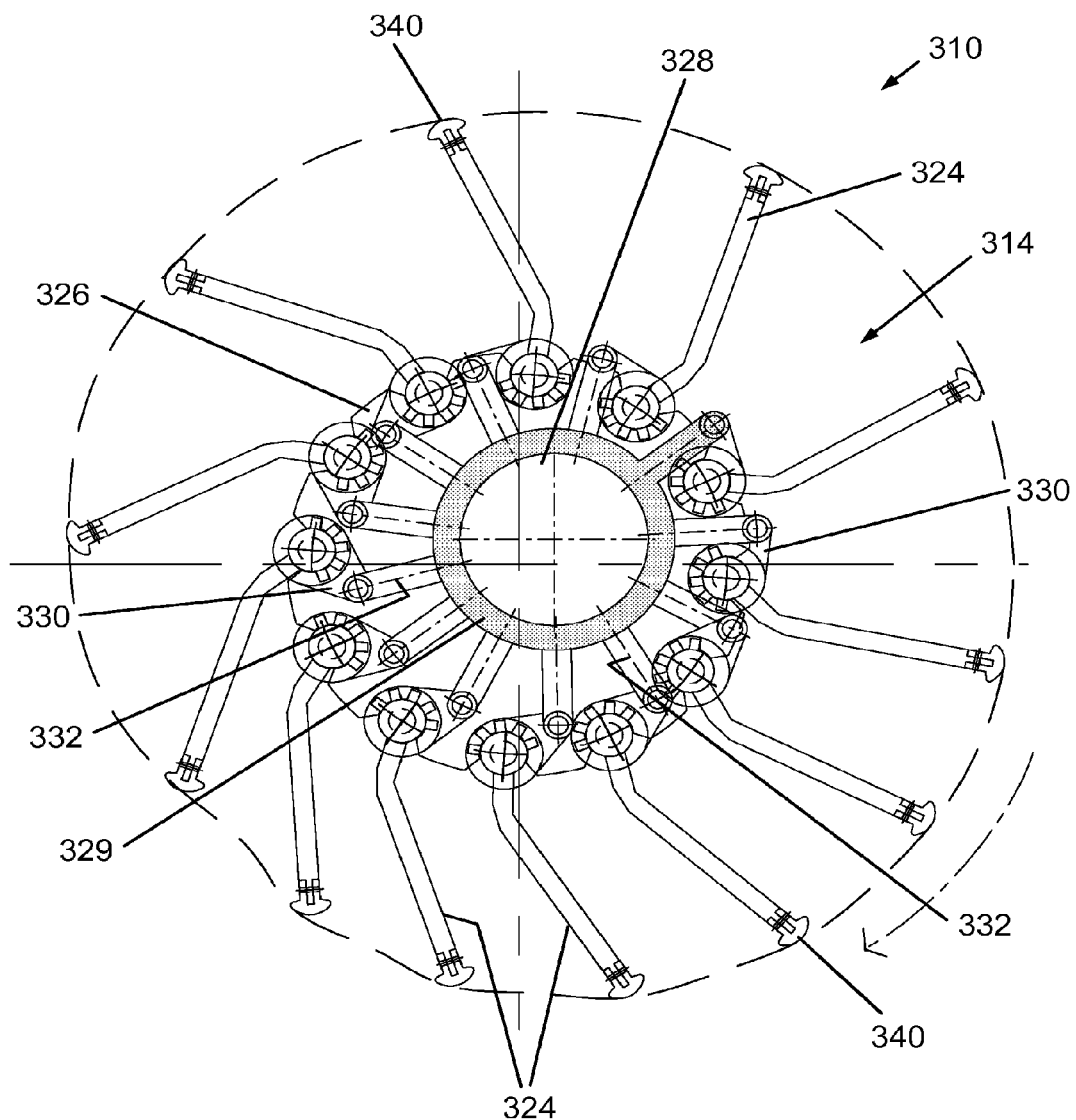
FIG. 10 is a detailed plan view of the hinge plate and blades of the generator assembly of FIG. 9.

Each rotor assembly 310 further comprises a plurality of vertically extending blades 324 mounted to the hub assembly 314 and extending radially therefrom. The hub assembly 314 further comprises an upper, generally circular hinge plate 326 and a lower hinge plate (not visible in FIGS. 7 and 8). Each blade 324 is pivotally mounted by a hinged connection to the upper hinge plate 326 and the lower hinge plate. The upper hinge plate 326 and the blades 324 of a single generator assembly are shown in more detail in FIG. 10. The hub assembly 314 is provided with a fixed cam wheel 328. Each blade 324 is provided with a lever 330 mounted on its upper end, the lever 330 of each blade being pivotally connected to a connecting rod 332 extending to a ring bearing 329 on the cam wheel 328. Each blade 324 is provided with a respective ring bearing 329. The cam wheel 328 is offset with respect to the hinge plate 326, as shown in FIG. 10. As the hub assembly 314 rotates, the cam wheel 328 is held fixed and bears on the ends of the connecting rods 332, which in turn act on the lever 330 of each blade 324 to rotate the blade. The cam wheel 328 is positioned relative to the hinge plate 326 to move the blades between a retracted position, as shown for the blades on the left side of FIG. 10, and an extended position, as shown for the blades on the right side of FIG. 10. The motion of the blades in operation is described in more detail below.

The blades 324 of each rotor assembly 310 are substantially flat or planar, having its inner portion curved, as shown in the plan view in FIGS. 9 and 10. In addition, each blade is provided with a flexible seal 340 along its outer edge.

As shown in FIG. 9, the rotor assemblies 310 are disposed such that the region swept by the blades of one rotor assembly overlaps the region swept by the blades of the second rotor assembly. This region is denoted as A in FIG. 9. The rotor assemblies 310 are further arranged such that the outer edges of the blades 324 contact the respective seal assembly 312 in the wall of the conduit 6. In this way, water is prevented from passing the rotor assemblies without impinging on a blade and providing drive to rotate the rotor assembly.

The general arrangement shown in FIG. 9 is of particular use in river flows of water, the normal direction of the river flows being indicated by the arrow V. However, the arrangement of FIG. 9 is also of particular use in rivers or other locations with flowing water that are prone to flooding, with water flowing in the reverse direction during periods of flooding, as shown by arrow W.

An upstream flow guide 350 is disposed centrally within the conduit at the upstream side of the rotor assemblies 310. A downstream flow guide 352 is disposed centrally within the conduit at the downstream side of the rotor assemblies 310. Each flow guide is generally aligned with the longitudinal axis of the conduit 6 and axially of the region A between the rotor assemblies 310. Each flow guide comprises a generally rounded nose 354 distal from the rotor assemblies 310, bounded on each side by a generally concave flow surface 356 arranged to direct incident water onto the blades of the adjacent rotor assembly at an angle to the longitudinal axis of the conduit and the general direction of flow of water.

The downstream flow guide 356 is disposed to be contacted by the outer edges of the blades of the rotor assemblies 310 as they rotate and is provided with appropriately curved surfaces facing the rotor assemblies, to prevent substantial flows of water between the blades and the flow guides. In this way, the major portion of the flow of water through the conduit is directed onto the blades of the rotor assemblies laterally outwards of the flow guides and the rotor hubs, thereby generating the maximum rotation of the rotor assemblies.

Further, the surfaces of the downstream flow guide 352 facing the rotor assemblies 310 are shaped to accommodate the outer edges of the blades 324 as the rotor assemblies rotate and the blades are moved by the cam wheel 328. In particular, the surfaces are provided with a profile that closely matches the path followed by the outer edges of the rotor blades 324 as they are moved during rotation by the cam wheel. In this way, the passage of water between the blades and the downstream flow guide 352 is minimised.

Should the assemblies of FIGS. 9 and 10 be required to control the level of water upstream of the barrage, means may be provided to control the speed of rotation of the rotor assemblies, in particular a variable gear take-off system to increase their resistance to rotation, thus reducing their speed of rotation, or to lock the rotor assemblies using a braking system or the like. In this way, the flow of water past the rotor assemblies is limited or prevented, allowing the level of water on the upstream side of the barrage to increase. In this case, the flow of water through the annular cavity in the hub assembly is prevented, as the blades 324 seal the conduit and prevent the flow of water therethrough.

It should also be noted that the assembly may be provided with means to drive the rotor assembly, for example dedicated motors or by using the generators. The rotor assemblies 310 may thus be rotated as required, to pump water in the opposite direction, for example from the downstream side to the upstream side of the installation.

Figure 11:
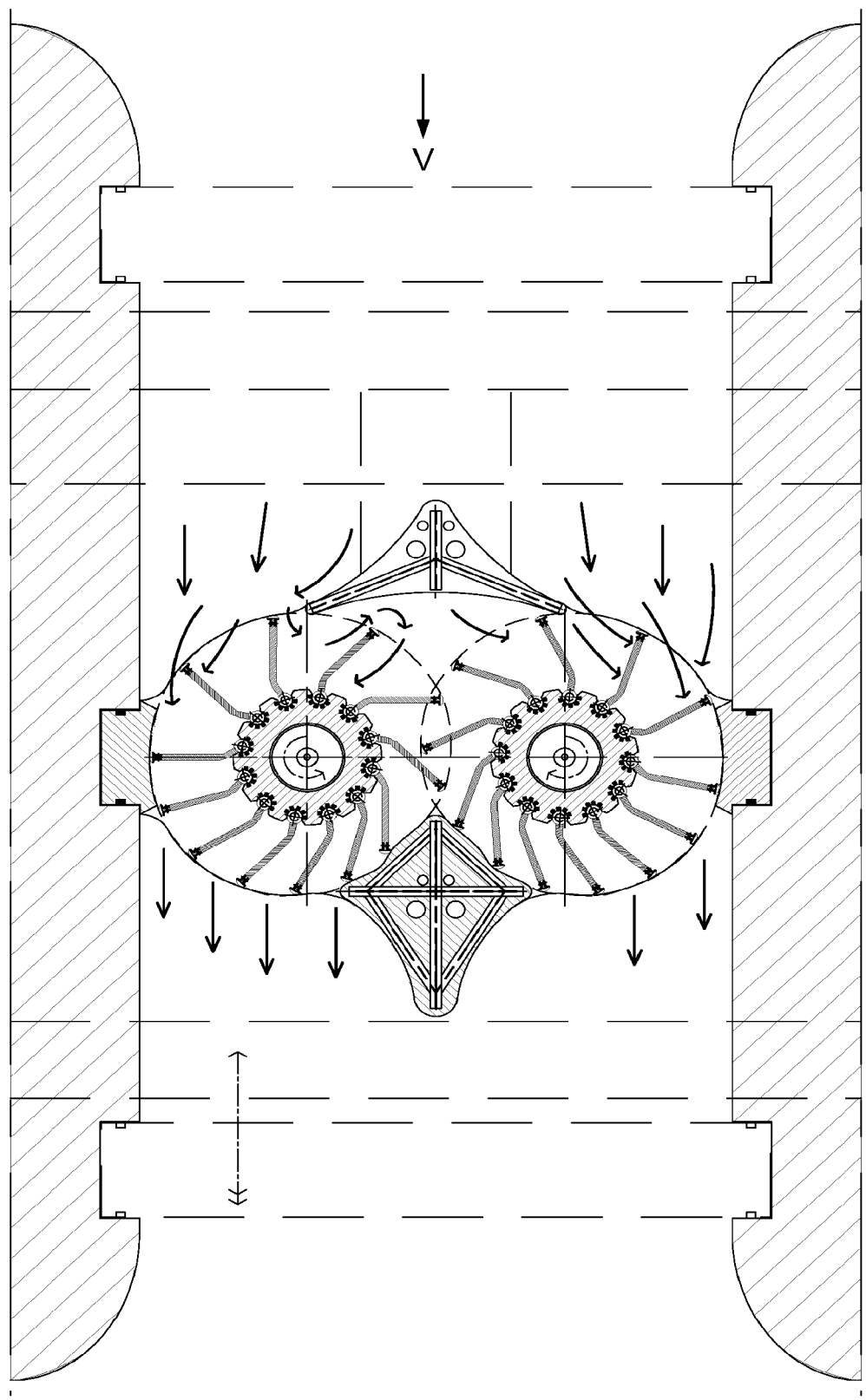
FIG. 11 is a plan view of the arrangement of FIG. 9 with arrows indicating the flow path of water during normal use.

Referring to FIG. 11, there is shown the arrangement of FIG. 9 with the flow of water past the rotor assemblies 310 when in operation indicated by arrows. The general direction of flow of water through the conduit 6 is indicated by the arrow V. As can be seen, the rotor assemblies and flow guides are arranged to maximise the water impinging on the surfaces of the blades and to prevent the rotor assemblies being by-passed by water within the conduit.

Figure 12:
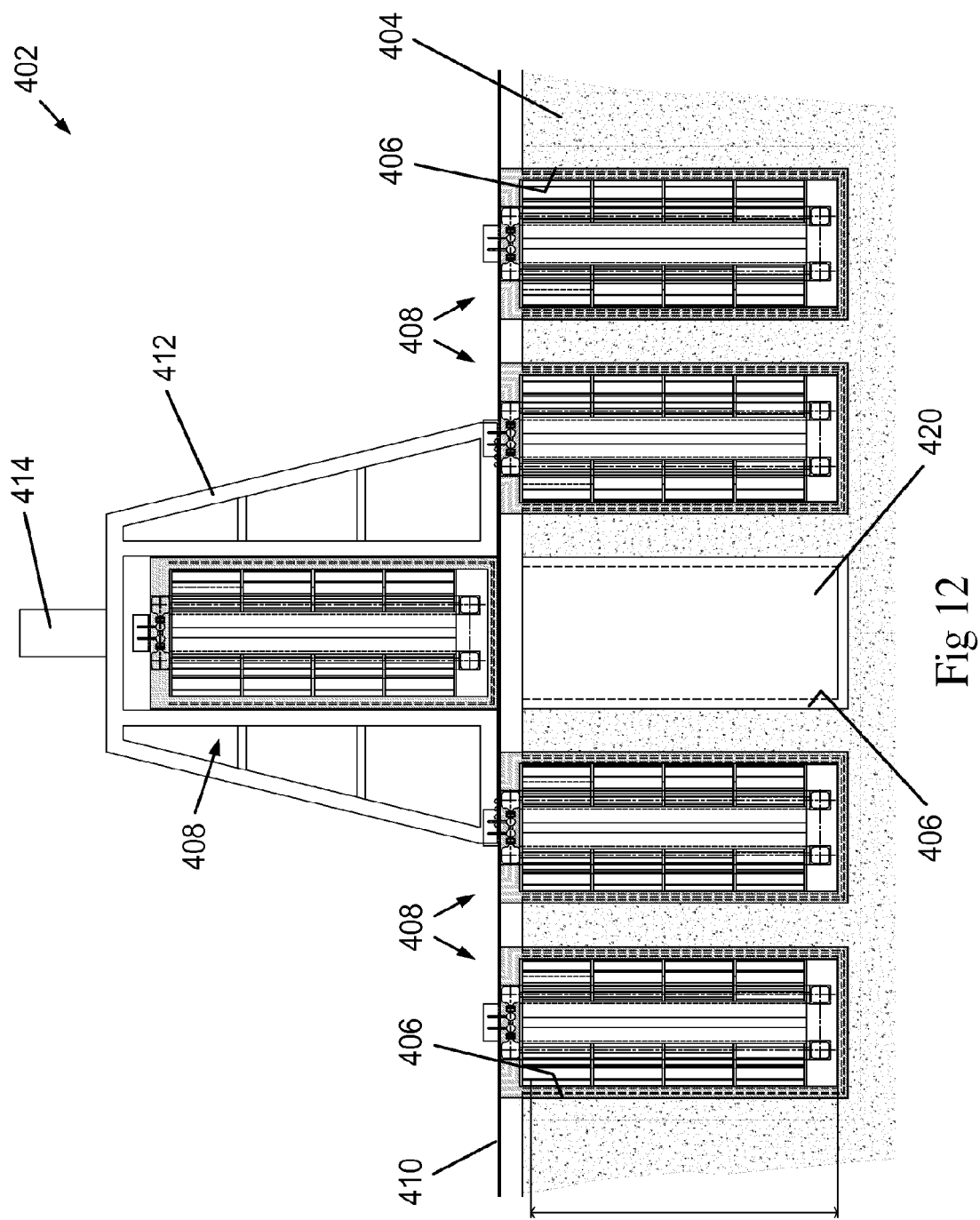
FIG. 12 is a front view of a barrage with a generator assembly removed for servicing or replacement.

Referring to FIG. 12, there is shown a front view of a barrage assembly of the general type of the present invention. The barrage assembly, generally indicated as 402, is shown extending across a flowing body of water as viewed from an upstream position. The barrage 402 extends across the body of water and presents an obstacle or dam to the normal flow of water. The body of water may be a river, river estuary or other body of water in which a flow or current occurs, for example a tidal flow.

The barrage 402 comprises a support structure, preferably a concrete support structure 404 extending from the bed of the body of water in a conventional manner. The barrage 402 comprises a plurality of conduits 406 formed therein as generally rectangular channels extending through the barrage from the upstream side to the downstream side in a direction generally parallel to the normal direction of flow of the water. Each conduit 406 houses a generator assembly 408. The generator assemblies may be of the general configuration described hereinbefore.

The support structure 404 is provided with a track 410 along its upper surface to provide access for vehicles and/or a lifting crane, to service the generator assemblies 408. As shown in FIG. 12, a trolley 412 is being used to remove a complete generator assembly 408. The generator assembly 408 has been raised from its respective conduit 406 by a lift assembly 414 provided in the trolley 412. The generator assembly 408 may be transported in the trolley along the track 410 to a suitable location remote from the barrage 404, for maintenance. The conduit 406 from which the generator assembly 408 is to be removed is sealed against the ingress of water by a maintenance gate 420, prior to the generator assembly removal.

It is a particular advantage of the generator assemblies of the present invention and the barrage arrangements of the present invention that they can be provided in modular form, such that individual generator assemblies may be installed and removed, for example as shown in FIG. 12. A given body of water may be provided with a barrage of the general type shown in the accompanying figures by casting a plurality of concrete support assemblies with conduits in sufficient number to extend across the body of water and the requisite generator assemblies provided to the location and installed.

The invention claimed is:

1. A system for the generation of energy from a flow of water having a general direction from upstream to downstream in a body of water having a bed and banks, the system comprising:
   a support assembly extending across at least a portion of the body of water;
   a generator assembly mounted in the support assembly, the generator assembly comprising a first rotor assembly and a second rotor assembly, each rotor assembly comprising a hub rotatable about an axis and a plurality of blades extending radially from the hub; and
   means to variably limit the speed of rotation of one or more of the first and second rotor assemblies and thereby control the water level upstream of the system.

2. The system according to claim 1, wherein the support assembly comprises a fixed structure extending from the bed of the body of water.

3. The system according to claim 1, comprising a plurality of generator assemblies.

4. The system according to claim 1, wherein the support assembly extends across the body of water.

5. The system according to claim 4, wherein the support assembly extends perpendicular to the banks of the body of water.

6. The system according to claim 1, wherein the support assembly extends perpendicular to the general direction of flow of water in the body of water.

7. The system of claim 1, wherein the means to variably limit the speed of rotation comprises one of a brake acting upon the hub of the first rotor assembly and the second rotor assembly and a variable speed energy take-off system.

8. The system according to claim 1, wherein each hub comprises a housing formed about the axis with an annular cavity extending between the axis and the housing, wherein the blades are mounted to the housing such that an inner portion of each blade is spaced from the axis, and wherein the hub is configured to allow water to flow between adjacent blades and into the annular cavity of each housing.

9. The system according to claim 8, wherein the housing of each hub comprises an inner hub portion and a plurality of plates extending radially outward from the inner hub portion, the inner portion of the blades mounted to an outer edge of the plates.

10. The system according to claim 8, further comprising a gate configured to selectively close the annular cavity in each hub to prevent water flowing therethrough.

11. The system according to claim 1, wherein the blades are planar.

12. The system according to claim 1, wherein the blades are provided with a curved portion at their edge.

13. The system according to claim 1, wherein the generator assembly is disposed in a conduit extending through the support assembly.

14. The system according to claim 13, wherein the axis of the conduit is parallel with the general direction of the flow of water.

15. The system according to claim 14, wherein the rotor assemblies are arranged to extend on a line perpendicular to the axis of the conduit.

16. The system according to claim 15, wherein the rotor assemblies extend across the width of the conduit, thereby presenting an obstacle to the flow of water therealong.

17. The system according to claim 16, wherein the opposing sides of the conduit are each provided with a seal assembly to cooperate with the outer edges of the blades.

18. The system according to claim 16, wherein the outer edges of the blades are provided with seals.

19. The system according to claim 1, wherein the first and second rotor assemblies are arranged such that a volume of water swept by the blades of the first rotor assembly overlaps a volume of water swept by the blades of the second rotor assembly, and wherein a seal assembly is disposed on an upstream side of the rotor assemblies to prevent water entering the overlapping swept volume of the rotor assemblies.

20. The system according to claim 1, wherein the first and second rotor assemblies are arranged such that a volume of water swept by the blades of the first rotor assembly overlaps a volume of water swept by the blades of the second rotor assembly, and wherein a seal assembly is disposed on a downstream side of the rotor assemblies to prevent water entering the overlapping swept volume of the rotor assemblies.

21. The system according to claim 1, wherein a flow guide assembly is disposed on an upstream side of the rotor assemblies to direct water onto the upstream blades of the rotor assemblies at an angle to the general direction of the flow of water.

22. The system according to claim 1, wherein a flow guide assembly is disposed on a downstream side of the rotor assemblies to direct water onto the upstream blades of the rotor assemblies at an angle to the general direction of the flow of water.

23. A system for the generation of energy from a flow of water having a general direction from upstream to downstream in a body of water having a bed and banks, the system comprising:
   a support assembly extending across at least a portion of the body of water;
   a generator assembly mounted in the support assembly, the generator assembly comprising a rotor assembly comprising a hub rotatable about an axis and a plurality of blades extending radially from the hub, adjacent blades of the rotor assembly defining between them a blade cavity;
   wherein the hub comprises a housing formed about the axis with an annular cavity extending between the axis and the housing,
   wherein the blades are mounted to the housing such that an inner portion of each blade is spaced from the axis, and
   wherein the hub is configured to allow water to flow from a first blade cavity of the rotor assembly to a second blade cavity of the rotor assembly through the annular cavity of the hub.

24. The system according to claim 23, wherein the support assembly comprises a fixed structure extending from the bed of the body of water.

25. The system according to claim 23, comprising a plurality of generator assemblies.

26. The system according to claim 24, wherein the support assembly extends across the body of water.

27. The system according to claim 26, wherein the support assembly extends perpendicular to the banks of the body of water.

28. The system according to claim 24, wherein the support assembly extends perpendicular to the general direction of flow of water in the body of water.

29. The system of claim 24, further comprising a means to variably limit the speed of rotation of the rotor assembly, to thereby control the water level upstream of the system.

30. The system according to claim 23, wherein the housing of the hub comprises an inner hub portion and a plurality of outer plates extending radially outward from the inner hub portion, the inner portion of the blades mounted to an outer edge of the plates.

31. The system according to claim 23, further comprising a gate configured to selectively close the annular cavity in the hub to prevent water flowing therethrough.

32. The system according to claim 23, wherein the blades are planar.

33. The system according to claim 23, wherein the blades are provided with a curved portion at their edge.

34. The system according to claim 23, wherein the generator assembly is disposed in a conduit extending through the support assembly.

35. The system according to claim 34, wherein the axis of the conduit is parallel with the general direction of the flow of water.

36. The system according to claim 35, wherein the system comprises two rotor assemblies disposed within the conduit, the rotor assemblies being arranged to extend on a line perpendicular to the axis of the conduit.

37. The system according to claim 34, wherein the rotor assemblies extend across the width of the conduit, thereby presenting an obstacle to the flow of water therealong.

38. The system according to claim 37, wherein the opposing sides of the conduit are each provided with a seal assembly to cooperate with the outer edges of the blades.

39. The system according to claim 23, wherein the outer edges of the blades are provided with seals.

40. A system to control a flow of water having a general direction from upstream to downstream in a body of water having a bed and banks, the system comprising:
   a support assembly having a conduit through which the water may flow;
   a rotor assembly disposed in the conduit, the rotor assembly comprising a hub rotatable about an axis and a plurality of blades extending radially from the hub;
   the conduit comprising first and second opposing surfaces contacted by the radially outer edge regions of each blade as the blades of the rotor assembly sweep by the first and second opposing surfaces, whereby there is at least one position of the rotor assembly when a blade is in contact with each of the first and second opposing surfaces; and
   means to variably limit the speed of rotation of the rotor assembly and thereby control the water level upstream of the system.

41. The system according to claim 40, wherein the support assembly extends perpendicular to the banks of the body of water.

42. The system according to claim 40, wherein the support assembly extends perpendicular to the general direction of flow of water in the body of water.

43. The system according to claim 40, wherein the hub comprises a housing formed about the axis with an annular cavity extending between the axis and the housing, wherein the blades are mounted to the housing such that an inner portion of each blade is spaced from the axis, and wherein the hub is configured to allow water to flow between adjacent blades and into the annular cavity of the housing.

44. The system according to claim 43, wherein the housing of the hub comprises an inner hub portion and a plurality of plates extending radially outward from the inner hub portion, the inner portion of the blades mounted to an outer edge of the plates.

45. The system according to claim 43, further comprising a gate to selectively close the annular cavity in the hub to prevent water flowing therethrough.

46. The system according to claim 40, wherein the blades are planar.

47. The system according to claim 40, wherein the blades are provided with a curved portion at their edge.

48. The system according to claim 40, wherein the axis of the conduit is parallel with the general direction of the flow of water.

49. The system according to claim 48, wherein the system comprises a plurality of rotor assemblies, the rotor assemblies being arranged to extend on a line perpendicular to the axis of the conduit.

50. The system according to claim 49, wherein the rotor assemblies extend across the width of the conduit, thereby presenting an obstacle to the flow of water therealong.

51. The system according to claim 40, wherein the opposing sides of the conduit are each provided with a seal assembly to cooperate with the outer edges of the blades.

52. The system according to claim 40, wherein the outer edges of the blades are provided with seals.

53. The system according to claim 40, wherein the means to variably limit the speed of rotation comprises one of a brake acting upon the rotor assembly and a variable speed energy take-off system.

54. The system according to claim 40, further comprising a motor for rotating the rotor assembly.

55. A method for controlling a flow of water having a general direction from upstream to downstream in a body of water having a bed and banks, the method comprising:
providing an obstacle to the flow of water;
providing a conduit in the obstacle for the passage of water therethrough;
providing a rotor assembly in the conduit, the rotor assembly comprising a hub rotatable about an axis and a plurality of blades extending radially from the hub;
the conduit comprising first and second opposing surfaces contacted by the radially outer edge regions of each blade as the blades of the rotor assembly rotates sweep by the first and second opposing surfaces, whereby there is at least one position of the rotor assembly when a blade is in contact with each of the first and second opposing surfaces; and
variably limiting the speed of rotation of the rotor assembly through the rotor assembly, thereby controlling the water level upstream of the system.

56. The method according to claim 55, wherein one of a brake acting upon the hub of the rotor assembly and a variable speed energy take-off system is used to variably limit the speed of rotation of the rotor assembly.

57. A method for generating energy from a flowing body of water, the method comprising:
providing an obstacle to the flow of water;
providing a conduit in the obstacle for the passage of water therethrough;
providing a rotor assembly in the conduit, the rotor assembly comprising a hub rotatable about an axis, the hub comprising a housing formed about the axis with an annular cavity extending between the axis and the housing and a plurality of blades mounted to the housing and extending radially from the hub such that an inner portion of each blade is spaced from the axis, adjacent blades of the rotor assembly defining between them a blade cavity such that the hub is configured to allow water to flow from a first blade cavity of the rotor assembly to a second blade cavity of the rotor assembly through the annular cavity of the hub; and
retrieving kinetic energy from rotation of the rotor assembly.

58. The method according to claim 57, further comprising converting kinetic energy from rotation of the rotor assembly to electrical energy.

59. The method according to claim 57, further comprising selectively opening and closing the annular cavity of the hub with a gate.

* * * * *